(12) United States Patent
Granato et al.

(10) Patent No.: US 11,336,193 B2
(45) Date of Patent: *May 17, 2022

(54) ISOLATED DC-DC CONVERTER

(71) Applicant: TEXAS INSTRUMENTS INCORPORATED, Dallas, TX (US)

(72) Inventors: Maurizio Granato, Milan (IT); Giovanni Frattini, Travaco' Siccomario (IT); Shailendra Kumar Baranwal, Murphy, TX (US)

(73) Assignee: Texas Instmments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,268

(22) Filed: Mar. 18, 2020

(65) Prior Publication Data

US 2020/0287473 A1 Sep. 10, 2020

Related U.S. Application Data

(63) Continuation of application No. 15/859,005, filed on Dec. 29, 2017, now Pat. No. 10,601,332.
(Continued)

(51) Int. Cl.
*H02M 3/335* (2006.01)
*H02M 1/088* (2006.01)
(Continued)

(52) U.S. Cl.
CPC ....... *H02M 3/33592* (2013.01); *H02M 1/088* (2013.01); *H02M 3/337* (2013.01); *H02M 1/0054* (2021.05); *H02M 1/0058* (2021.05)

(58) Field of Classification Search
CPC .......... H02M 3/22; H02M 3/24; H02M 3/315; H02M 3/3155; H02M 3/325; H02M 3/335;
(Continued)

(56) References Cited

U.S. PATENT DOCUMENTS

| 5,027,264 A | 6/1991 | DeDoncker et al. |
| 5,355,294 A | 10/1994 | DeDoncker et al. |

(Continued)

FOREIGN PATENT DOCUMENTS

| EP | 2757675 A2 | 7/2014 | |
| JP | 6-251995 | 9/1994 | |
| WO | WO-2017123241 A1 * | 7/2017 | ........ H02M 3/33584 |

OTHER PUBLICATIONS

Zhang et al., "A High Efficiency Flyback Converter with New Active Clamp Technique", IEEE Transactions on Power Electronics, vol. 25, No. 7, Jul. 2010, pp. 1775-1785.
(Continued)

*Primary Examiner* — Thienvu V Tran
*Assistant Examiner* — Carlos O Rivera-Perez
(74) *Attorney, Agent, or Firm* — Brian D. Graham; Charles A. Brill; Frank D. Cimino

(57) ABSTRACT

In described examples, an isolated DC-DC converter includes: an input node for receiving an input voltage; a transformer including a primary side having first and second terminals and a primary side ground; and first and second low-side switches. The first low-side switch is coupled between the first terminal and the primary side ground. The second low-side switch is coupled between the second terminal and the primary side ground. A first voltage is across the first low-side switch, and a second voltage is across the second low-side switch. Also, the isolated DC-DC converter includes first and second high-side switches. The first high-side switch is coupled between the first terminal and the input node. The second high-side switch is coupled between the second terminal and the input node. Further, the isolated DC-DC converter includes a switch controller.

18 Claims, 10 Drawing Sheets

Related U.S. Application Data

(60) Provisional application No. 62/560,647, filed on Sep. 19, 2017.

(51) Int. Cl.
*H02M 3/337* (2006.01)
*H02M 1/00* (2006.01)

(58) Field of Classification Search
CPC ......... H02M 3/33507; H02M 3/33515; H02M 3/33523; H02M 3/3353; H02M 3/33538; H02M 3/33546; H02M 3/33553; H02M 3/33569; H02M 3/33576; H02M 3/33584; H02M 3/33592; H02M 3/337; H02M 3/338; H02M 3/3381; H02M 3/3382; H02M 3/3384; H02M 3/3385; H02M 3/3387; H02M 3/3388; H02M 2001/0048; H02M 2001/0054; H02M 2001/0058; H02M 1/08; H02M 1/083; H02M 1/088; H02M 7/155; H02M 7/162; H02M 7/1623; H02M 7/1626; H02M 7/217; H02M 7/219; H02M 7/42; H02M 7/44; H02M 7/516; H02M 7/521; H02M 7/5233; H02M 7/5387; H02M 1/0048; H02M 1/0054; H02M 1/0058; H02M 3/33571; H02M 3/33573; H02M 1/0083; H02M 1/0085; H02M 1/0095; Y02B 70/10
USPC ................. 363/15–21.3, 22, 23, 40–48, 123, 363/125–127, 131–139; 323/234, 235, 323/237, 238, 271–275, 282–286, 351
See application file for complete search history.

(56) References Cited

U.S. PATENT DOCUMENTS

| | | | |
|---|---|---|---|
| 5,414,609 A | 5/1995 | Levran et al. | |
| 5,457,624 A | 10/1995 | Hastings | |
| 5,590,032 A | 12/1996 | Bowman et al. | |
| 5,648,705 A | 7/1997 | Sitar et al. | |
| 6,108,219 A * | 8/2000 | French | H02M 3/3388 363/23 |
| 6,147,393 A | 11/2000 | Zommer | |
| 6,324,084 B1 | 11/2001 | Fujisawa | |
| 6,441,598 B1 | 8/2002 | Ivanov | |
| 6,456,511 B1 | 9/2002 | Wong | |
| 6,567,285 B2 | 5/2003 | Cho et al. | |
| 6,686,729 B1 | 2/2004 | Kawamura et al. | |
| 6,861,826 B2 | 3/2005 | Lynch | |
| 7,764,527 B2 | 7/2010 | Takayanagi | |
| 8,436,709 B2 | 5/2013 | Fouquet et al. | |
| 8,456,867 B1 | 6/2013 | Karlsson et al. | |
| 8,466,535 B2 | 6/2013 | Hopper et al. | |
| 8,674,418 B2 | 3/2014 | Poddar et al. | |
| 8,963,529 B2 | 2/2015 | Cohen | |
| 8,964,420 B2 | 2/2015 | Zhang | |
| 9,035,422 B2 | 5/2015 | Khanolkar et al. | |
| 9,673,721 B2 | 6/2017 | Trecases et al. | |
| 9,748,853 B1 | 8/2017 | Li | |
| 10,090,769 B2 | 10/2018 | Baranwal et al. | |
| 10,211,747 B2 | 2/2019 | Agamy et al. | |
| 10,601,332 B2 * | 3/2020 | Granato | H02M 3/33592 |
| 2002/0141209 A1 | 10/2002 | Bridge | |
| 2004/0070378 A1 | 4/2004 | Baldwin et al. | |
| 2007/0058402 A1 | 3/2007 | Shekhawat et al. | |
| 2007/0121350 A1 | 5/2007 | Duvnjak | |
| 2007/0188288 A1 | 8/2007 | Ishii | |
| 2008/0212340 A1 | 9/2008 | Tao et al. | |
| 2008/0298106 A1 | 12/2008 | Tateishi | |
| 2009/0185397 A1 | 7/2009 | Forghani-zadeh et al. | |
| 2009/0196072 A1 | 8/2009 | Ye | |
| 2010/0027298 A1 | 2/2010 | Cohen | |
| 2010/0182803 A1 | 7/2010 | Nan et al. | |
| 2010/0315840 A1 | 12/2010 | Cohen | |
| 2011/0090725 A1 | 4/2011 | Lu | |
| 2011/0199799 A1 | 8/2011 | Hui et al. | |
| 2011/0205764 A1 | 8/2011 | Sheng et al. | |
| 2011/0249472 A1 | 10/2011 | Jain et al. | |
| 2012/0002377 A1 | 1/2012 | French et al. | |
| 2012/0081928 A1 | 4/2012 | Roessler et al. | |
| 2012/0099345 A1 | 4/2012 | Zhao et al. | |
| 2012/0275198 A1 | 11/2012 | Cohen | |
| 2013/0001735 A1 | 1/2013 | Hopper et al. | |
| 2013/0037908 A1 | 2/2013 | Hopper et al. | |
| 2013/0037909 A1 | 2/2013 | French et al. | |
| 2013/0077356 A1 | 3/2013 | Cohen | |
| 2013/0148385 A1 | 6/2013 | Zhang | |
| 2013/0272036 A1 | 10/2013 | Fang | |
| 2014/0003096 A1 | 1/2014 | Deng | |
| 2014/0078782 A1 | 3/2014 | Rosado et al. | |
| 2015/0092454 A1 | 4/2015 | Cohen | |
| 2015/0103563 A1 | 4/2015 | Wang | |
| 2015/0214846 A1 | 7/2015 | Cohen | |
| 2015/0365005 A1 | 12/2015 | Panov et al. | |
| 2016/0006356 A1 | 1/2016 | Nirantare et al. | |
| 2016/0020702 A1 | 1/2016 | Trescases et al. | |
| 2016/0072312 A1 | 3/2016 | Ichikawa et al. | |
| 2016/0094137 A1 | 3/2016 | Jitaru et al. | |
| 2016/0118904 A1 | 4/2016 | Yoshikawa et al. | |
| 2016/0149504 A1 | 5/2016 | Quigley | |
| 2016/0233779 A1 | 8/2016 | Cohen | |
| 2016/0268909 A1 | 9/2016 | Liu et al. | |
| 2016/0352237 A1 | 12/2016 | Quigley | |
| 2016/0365802 A1 | 12/2016 | Freeman et al. | |
| 2018/0041130 A1 | 2/2018 | Kunz et al. | |
| 2018/0340961 A1 | 11/2018 | Adoni et al. | |

OTHER PUBLICATIONS

STIC search report from EIC 2800 searcher Benjamin Martin, dated Mar. 13, 2018 (13 pages).
Non-haloganated Low CTE BT Resin Laminate for IC Plastic Packages, MGC Mitsubishi Gas Chemical Company, Inc., available at www.jgc.co.jp/eng/products/lm/btprint/lineup/hfbt.html on Aug. 26, 2013 (pp. 1-5).
G200 BT/Epoxy Laminate and Prepreg, Isola Laminate Systems Corp., Data Sheet #5027/3/01, 1999, pp. 1-2.
LTM2881 Complete Isolated RS485/RS422 uModule Transceiver + Power, Linear Technology Corporation, LT0213 Rev F, 2009, pp. 1-24.
Krakauer, David, "Anatomy of a Digital Isolator", Analog Devices, Inc., Technical Article MS-2234, Oct. 2011, pp. 1-3.
Weinberg, et al.; "A New Zero Voltage and Zero Current Power-Switching Technique"; IEEE Transactions on Power Electronics; vol. 7. No. 4; Oct. 1992; pp. 655-665.

\* cited by examiner

ISOLATED DC-DC CONVERTER

CROSS-REFERENCES TO RELATED APPLICATIONS

This application is a continuation of U.S. patent application Ser. No. 15/859,005, filed on Dec. 29, 2017, which claims priority to U.S. Provisional Pat. App. No. 62/560,647, filed on Sep. 19, 2017, each of which is hereby incorporated by reference in its entirety.

U.S. patent application Ser. No. 15/859,005, of which the present application is a continuation, is related to co-pending and co-assigned U.S. patent application Ser. No. 15/859,135, filed on Dec. 29, 2017, and entitled, "ISOLATED DC-DC CONVERTER" and to co-pending and co-assigned U.S. patent application Ser. No. 15/859,145, filed on Dec. 29, 2017, and entitled, "ISOLATED DC-DC CONVERTER."

BACKGROUND

This relates generally to isolated DC-DC converters, and more particularly to efficient, high input and/or output voltage isolated DC-DC converters.

Isolated DC-DC converters typically include a transformer, with: (a) a power generating input side, typically called the primary side; and (b) a power output side, typically called the secondary side. The differences between an isolated converter and a non-isolated converter are that: (a) in an isolated converter, the primary side and the secondary side have different grounds; and (b) in a non-isolated converter, the primary side and the secondary side share a same ground (such as using an inductor, instead of a transformer, to convert voltage).

Isolated DC-DC converters can be small enough to fit within an integrated circuit ("IC") package, but may require significant current on the primary side to drive the secondary side across the isolation barrier, i.e., the gap between the transformer coils. Such converters can be used for transferring power from a high voltage domain to a low voltage domain, such as from a power line to a set of consumer electronics, or from a battery on an electric vehicle to electronics on that vehicle. Grounds in high voltage regimes (e.g., the power line or battery) may have voltage swings (such as 1000V or 1500V swings), which the devices connecting to those grounds are designed to tolerate. Grounds in the low voltage regimes may have much smaller swings (such as much less than 1V), and devices connected to those low voltage grounds could be rendered inoperative if subjected to the voltage swings tolerated in a high voltage regime. Isolation barriers separate high voltage regimes from low voltage regimes, so that power transfer can be performed without damaging low voltage components.

SUMMARY

In described examples, an isolated DC-DC converter includes: an input node for receiving an input voltage; a transformer including a primary side having first and second terminals and a primary side ground; and first and second low-side switches. The first low-side switch is coupled between the first terminal and the primary side ground. The second low-side switch is coupled between the second terminal and the primary side ground. A first voltage is across the first low-side switch, and a second voltage is across the second low-side switch. Also, the isolated DC-DC converter includes first and second high-side switches. The first high-side switch is coupled between the first terminal and the input node and is configured to be activated by a voltage at the second terminal. The second high-side switch is coupled between the second terminal and the input node and is configured to be activated by a voltage at the first terminal. Further, the isolated DC-DC converter includes a switch controller to cause the first and second voltages to alternatingly be zero by opening and closing the first and second low-side switches, as follows. The first low-side switch is closed when the first voltage is zero. During a first phase, the first low-side switch is opened at a time to enable a current through the primary side to charge the first terminal to the input voltage while discharging the second terminal to reduce the second voltage to zero. The second low-side switch is closed when the second voltage is zero. During a second phase, the second low-side switch is opened at a time to enable the current through the primary side to charge the second terminal to the input voltage while discharging the first terminal to reduce the first voltage to zero.

DETAILED DESCRIPTION OF EXAMPLE EMBODIMENTS

Example embodiments include methods, devices and systems for efficient (and in some embodiments, high input-output voltage), isolated DC-DC converters, particularly using circuits and components that can be incorporated into an integrated circuit (IC) package. In some embodiments, the converters are capable of operating at large minimum voltage differentials between Vin (input voltage) and primary ground, and/or between Vout (output voltage) and secondary ground (e.g., 10V or 15V), as further described hereinbelow.

Figure 1:
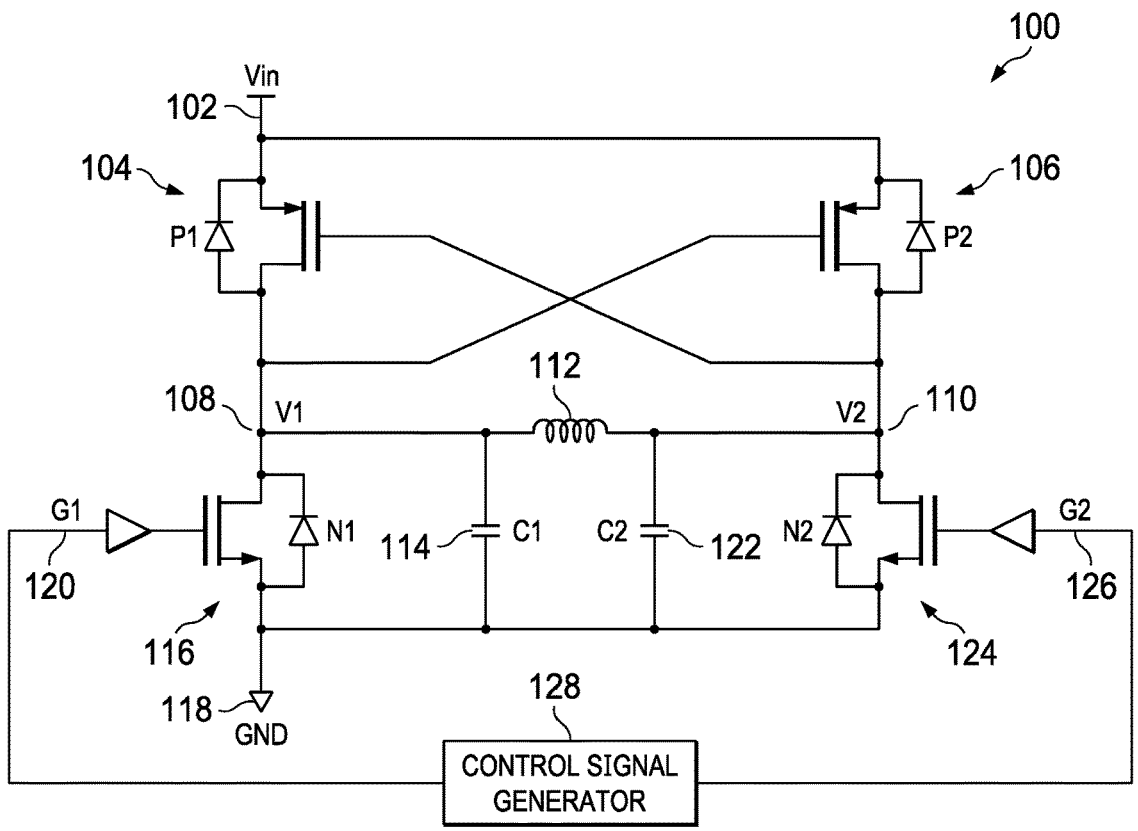
FIG. 1 shows an example of a transistor-level diagram of a circuit portion used to construct an isolated DC-DC converter.

FIG. 1 shows an example of a transistor-level diagram of a circuit portion 100 used to construct an isolated DC-DC converter. As shown in FIG. 1, an input voltage Vin 102 is connected to the sources of two PMOS transistors, P1 104 and P2 106 (PMOS conduction type). (Diodes shown are intrinsic diodes of respective PMOS and NMOS transistors.) Nodes V1 108 and V2 110 are cross-coupled between the drains and gates of P1 104 and P2 106 (high side switches). Accordingly, node V1 108 is connected to the drain of P1 104 and is connected to the gate of P2 106; and node V2 110 is connected to the drain of P2 106 and is connected to the gate of P1 104.

An inductor 112 can also be considered a primary side or a secondary side of a transformer—accordingly, the primary side or secondary side of a transformer is an inductor, and circuit portion 100 can be used to construct an isolated DC-DC converter such that the primary side or secondary side of a transformer in the converter stands in place of the inductor 112 (see, e.g., FIGS. 2, 4, 5, 8 and 10). The inductor 112 is connected between nodes V1 108 and V2 110.

Parasitic capacitor C1 114 and the source/drain path of NMOS transistor N1 116 (NMOS conduction type) are connected in parallel between node V1 108 and GND 118 (the source of N1 116 is connected to GND 118). C1 114 corresponds to (represents) parasitic capacitances of N1 116, P1 104 and P2 106. For example, C1 114 includes drain-source capacitance of N1 116, drain-source capacitance of P1 104, and gate-source capacitance of P2 106. The gate of N1 116 is connected to a (buffered) control signal G1 120.

Parasitic capacitor C2 122 and the source/drain path of NMOS transistor N2 124 are connected in parallel between node V2 110 and GND 118 (the source of N2 124 is connected to GND 118). C2 122 corresponds to (represents) parasitic capacitances of N2 124, P1 104 and P2 106. For example, C2 122 includes drain-source capacitance of N2 124, drain-source capacitance of P2 106, and gate-source capacitance of P1 104. The gate of N2 124 is connected to a (buffered) control signal G2 126. (N1 116 and N2 124 comprise low side switches.)

Inputs G1 120 and G2 126 are preferably generated by a control signal generator 128. An isolated DC-DC converter (e.g., as in FIGS. 2, 4, 5, 8 and 10) preferably comprises a primary control signal generator and a secondary control signal generator, with the generators respectively and separately connected to generate and deliver control signals to drive controlled switches (e.g., N1 116 and N2 124).

Preferably, power losses are minimized. Converters can lose power, such as through switching losses, conduction losses, and other dissipative losses. Switching losses in MOSFET devices come from the dynamic voltages and currents a MOSFET handles during the finite, nonzero time it takes to turn on or off. Conduction losses are power dissipation losses resulting from current moving through a component; for example, MOSFET devices have nonzero resistance. Other dissipative losses occur, such as when power is discharged to ground, e.g., when a charged gate or capacitor is connected to ground, resulting in the gate or capacitor discharging.

In operation, the NMOS transistors N1 116 and N2 124 are preferably zero voltage switched (ZVS) and zero current switched (ZCS). Accordingly, G1 120 and G2 126 are respectively controlled to turn N1 116 and N2 124 on OR off (generally one or the other and not both; the other of turn-on or turn-off timing is determined using other criteria, such as further described with respect to FIG. 3), when corresponding adjacent nodes V1 108 and V2 110 are fully discharged (at zero voltage with respect to GND 118), and zero current flows across the inductor 112 (from node V1 108 to node V2 110 or vice versa). This results in minimal switching losses for either the turn-on or turn-off transition, because little or no voltage is across (and little or no current is conducted by) N1 116 and N2 124 while they are switched. Zero voltage switching and zero current switching are further described hereinbelow with respect to FIG. 3. (Where this description refers to zero voltage at a node, rather than across a component, it means that the node is at a voltage of a corresponding ground of a primary side or secondary side of a transformer.)

In embodiments as shown in FIG. 1, power cost for MOSFET control is reduced by making P1 104 and P2 106 self-driving. Accordingly, rather than requiring control signals to bias P1 104 and P2 106, P1 104 and P2 106 are biased by charge driven to P1 104 and P2 106 via nodes V2 110 and V1 108 (respectively) by the current through the resonance (inductor 112). Self-driving P1 104 and P2 106 reduces the complexity and power cost of controlling the MOSFETS.

Further power savings are achieved by using the current across the inductor 112 (the resonance current) to drive charge out of the gates of MOSFETS P1 104 and P2 106 and turn that charge into current across the inductor 112. Some of that current charges capacitances C2 122 and C1 114. (Capacitances C1 114 and C2 122 include gate-source parasitic capacitances of P1 106 and P2 104, respectively.) This recycling avoids dissipation of gate charges (Cgs charges) when P1 104 and P2 106 are switched, because those gate charges are reused. Accordingly, those gate charges (charges of gate-source parasitic capacitances), along with charges of respective drain-source and other parasitic capacitances, are driven out of C1 114 or C2 122 by the resonance current, turned into current across the inductor 112, and (in part) are used to charge C2 122 or C1 114 (respectively).

Because gate charge of P1 104 and P2 106 are reused, the tradeoff between QG (gate charge) and RDS (drain-source on resistance) can be largely avoided for P1 104 and P2 106. For example, a lower RDS can generally be used, thereby enabling faster switching and lower heat output, without resulting in excessive power costs due to a higher QG, because the gate charge power cost is largely avoided (energy used to bias P1 104 and P2 106 is repeatedly recovered) after initial charging. (The figure of merit FOM=QG*RDS will generally be approximately constant for a given process technology). Accordingly, the configuration shown in FIG. 1 enabling P1 104 and P2 106 to be self-driven is relatively non-dissipative compared to gate driving using control signals because energy is taken back from parasitic capacitances C1 114 and C2 122. Energy "recycling" is performed by discharging capacitances and turning voltage into current through the inductor 112. Switching losses are thereby minimized. (See also similar cross-coupled switches in FIG. 7.)

The sources of N1 116 and N2 124 are preferably connected directly to GND 118, reducing the power required to bias N1 116 and N2 124. Also, N1 116 and N2 124 can be driven using fixed frequency, fixed or adaptive duty cycle signals. Driving N1 116 and N2 124 at a fixed frequency, with a fixed or adaptive duty cycle, reduces the complexity and power cost of controlling the MOSFETS. (Duty cycle can be adaptive to maintain zero voltage switching and zero current switching conditions despite variations of circuit parameters or switching frequency, as further described with respect to FIG. 2.)

Preferably, RMS currents are minimized to thereby lower conduction losses.

Figure 2:
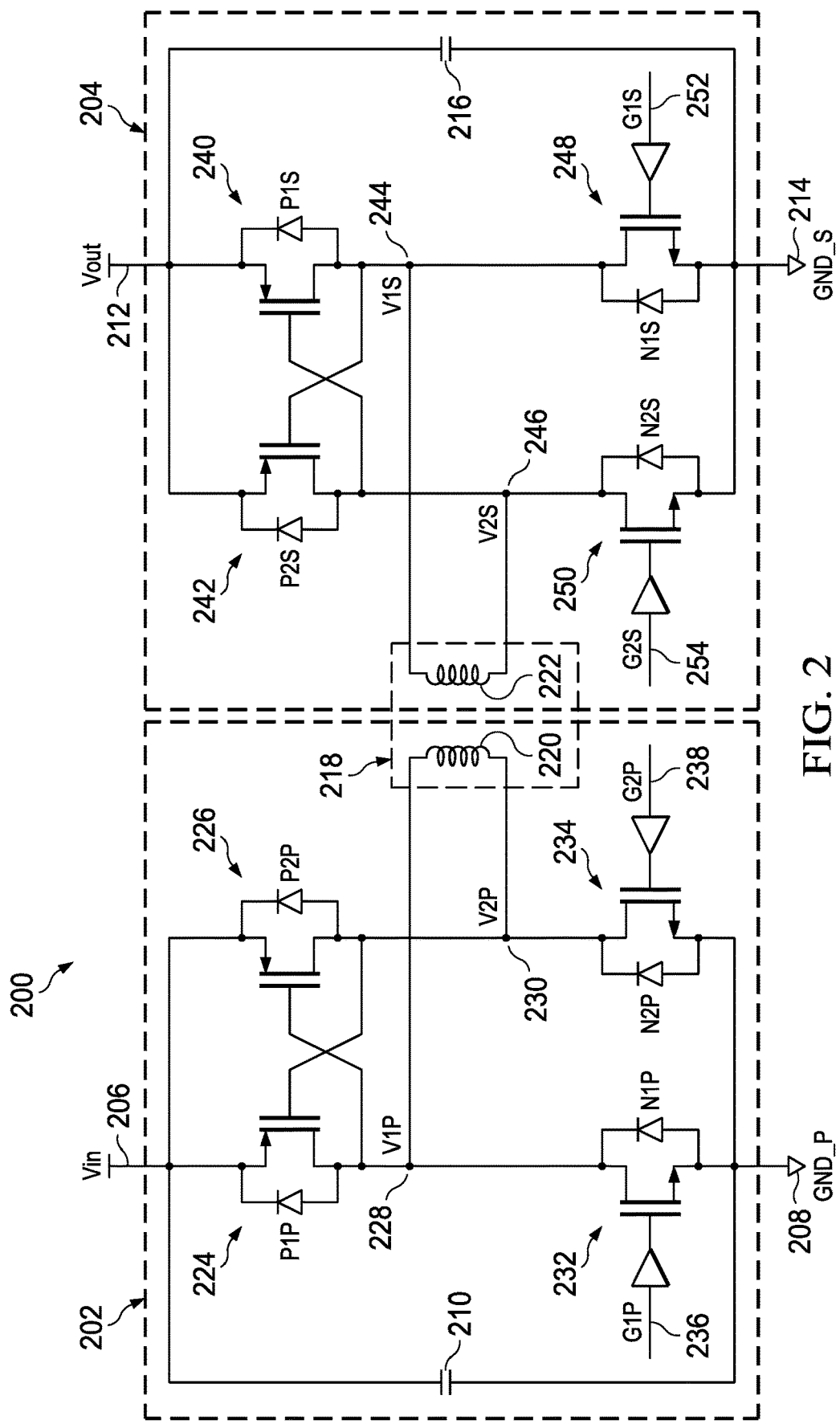
FIG. 2 shows a transistor-level diagram of an isolated DC-DC converter.

FIG. 2 shows a transistor-level diagram of an isolated DC-DC converter 200. The converter 200 can be broadly described as two instances of the circuit portion 100, one on the input side 202 and one on the output side 204, except that the input side 202 also comprises a capacitor connected between Vin 206 and input ground GND_P 208 acting as an input filter 210, and the output side 204 also comprises a capacitor connected between Vout 212 and output ground GND_S 214 acting as an output filter 216 (input and output filters 210, 216 are further described hereinbelow). A transformer 218 comprises a primary side 220 and a secondary side 222. The primary side 220 and secondary side 222 of the transformer 218 each preferably function similarly, with respect to their respective side of the converter 200 (i.e., the input side 202 and the output side 204), to the inductor 112 of the circuit portion 100 described with respect to FIG. 1.

As shown in FIG. 2, on the input side 202, input voltage Vin 206 is connected to the sources of two PMOS transistors, P1P 224 and P2P 226. Nodes V1P 228 and V2P 230 are cross-coupled between the drains and gates of P1P 224 and P2P 226. Accordingly, node V1P 228 is connected to the drain of P1P 224 and the gate of P2P 226; and node V2P 230 is connected to the drain of P2P 226 and the gate of MP 224. The primary side 220 of the transformer 218 is connected between V1P 228 and V2P 230. V1P 228 is also connected to the drain of NMOS transistor N1P 232, and V2P 228 is also connected to the drain of NMOS transistor N2P 234.

Control signal G1P 236 (switch control voltage) is connected (through a buffer) to the gate of N1P 232, and control signal G2P 238 is connected (through a buffer) to the gate of N2P 234. The sources of both N1P 232 and N2P 234 are connected to primary side ground GND_P 208. (Parasitic capacitances corresponding to C1 114 and C2 122 exist, but are not shown.)

On the output side 204, Vout 212 is connected to the sources of two PMOS transistors, P1S 240 and P2S 242. Nodes V1S 244 and V2S 246 are cross-coupled between the drains and gates of P1S 240 and P2S 242. Accordingly, node V1S 244 is connected to the drain of P1S 240 and is connected to the gate of P2S 242; and node V2S 246 is connected to the drain of P2S 242 and is connected to the gate of P1S 240. The secondary side 204 of the transformer 218 is connected between V1S 244 and V2S 246. V1S 244 is also connected to the drain of NMOS transistor N1S 248, and V2S 246 is also connected to the drain of NMOS transistor N2S 250.

Control signal G1S 252 is connected (through a buffer) to the gate of N1S 248, and control signal G2S 254 is connected (through a buffer) to the gate of N2S 250. The sources of both N1S 248 and N2S 250 are connected to secondary side ground GND_S 214. (Parasitic capacitances corresponding to C1 114 and C2 122 exist, but are not shown.)

Vin 206 is preferably connected to GND_P 208 through a capacitor acting as an input filter 210 (a decoupling capacitor), which reduces the "ripple"—the noise—in the power signal transmitted from the primary side 220 to the secondary side 222 of the transformer 218. The input filter 210 also acts as a local bypass element to keep on-chip supply voltage stable regardless of voltage noise generated by the input current, rapid parametric variations in the package, and bond-wires series resistance and inductance. Similarly, Vout 212 is preferably connected to GND_S 214 through a decoupling capacitor acting as an output filter 216, which reduces the ripple in the output of the converter 200, and acts as a local bypass element to keep on-chip supply voltage stable, similarly to the input filter 210.

Preferably, in embodiments as shown in FIG. 2, the voltage difference between Vin 206 and GND_P 208, and the voltage difference between Vout 212 and GND_S 214, are both about 5 volts or less. This enables use of smaller (smaller device area) input and output filters 210, 216 that can be fabricated using relatively inexpensive and/or straightforward processing techniques (preferably the same class of techniques as used for the majority of other converter components), e.g., CMOS processing. Accordingly, capacitors rated for approximately 5 volts or less are generally higher density (take up less device area), cheaper to fabricate and can be fabricated with fewer additional process steps than capacitors rated for significantly more than 5 volts (e.g., 10 or 15 volts).

Switching on the input side 202 and on the output side 204 is preferably adaptive. Accordingly, current through the primary and secondary sides 220, 222 of the transformer 218 is (respectively) tracked at NMOS transistor turn-on on the primary side 220, and at NMOS transistor turn-off on the secondary side 222, to check whether current is positive or negative. Switch timing—signal timing for G1P 236, G2P 238, G1S 252 and G2S 254—is then adjusted to enable zero current switching and zero voltage switching of respective NMOS transistors.

G1P 236 and G2P 238 are preferably controlled to switch on N1P 232 and N2P 234, respectively, when zero voltage is across switch N1P 232 or N2P 234, respectively. Preferably, turn-off of primary side switches N1P 232 and N2P 234 is controlled by a fixed timing (fixed frequency and adaptive duty cycle) selected to obtain zero voltage turn-on of N2P 234 and N1P 232 (respectively) in the subsequent phase of the cycle. Accordingly, the transition time between switching off N1P 232 and N2P 234 is selected to enable the transformer current to charge V1P 228 and V2P 230 to Vin (in respective cycle phases) and subsequently discharge V2P 230 and V1P 228 (respectively) to GND_P 208, in order to turn on N2P 234 and N1P 232 (respectively) at zero voltage across the switches N2P 234 and N1P 232.

G1S 252 and G2S 254 are preferably controlled to switch off N1S 248 and N2S 250, respectively, when zero current flows through the secondary side 222 of the transformer 218, and zero voltage is across switches N1S 248 and N2S 250. Preferably, turn-on of secondary side switches N1S 248 and N2S 250 is controlled by a fixed timing (fixed frequency and adaptive duty cycle) according to a selected switching frequency of the converter 200.

Input side 202 and output side 204 switch timings are also preferably independent of each other. Preferably, output side timings are similar to (or the same as) input side timings in having the same switching frequency and duty cycle, but with a phase delay with respect to input side timings—accordingly, output side timings are phase shifted later than corresponding input side timings.

Figure 3:
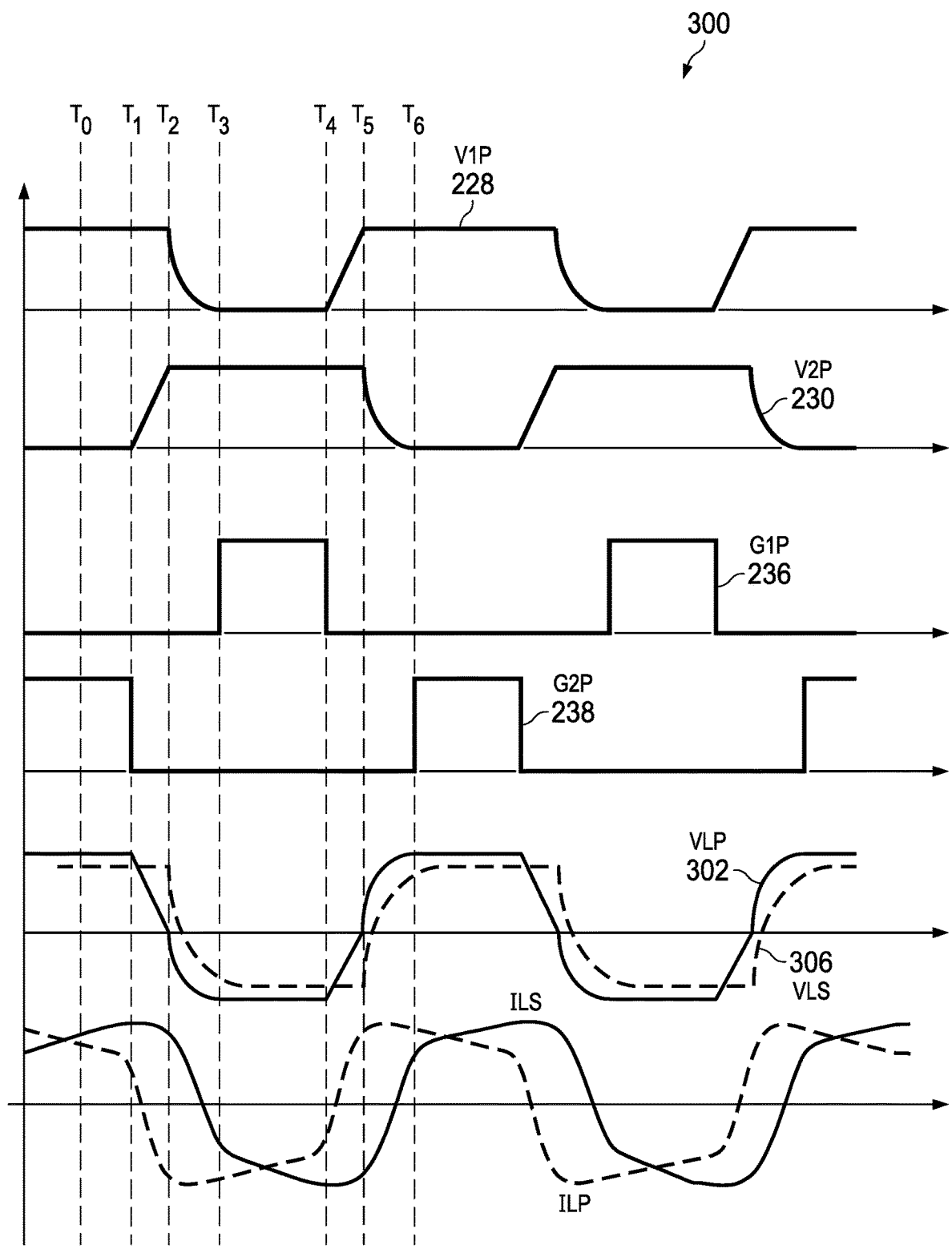
FIG. 3 shows a timing diagram for an isolated DC-DC converter as shown in and described with respect to FIG. 2.
Figure 5:
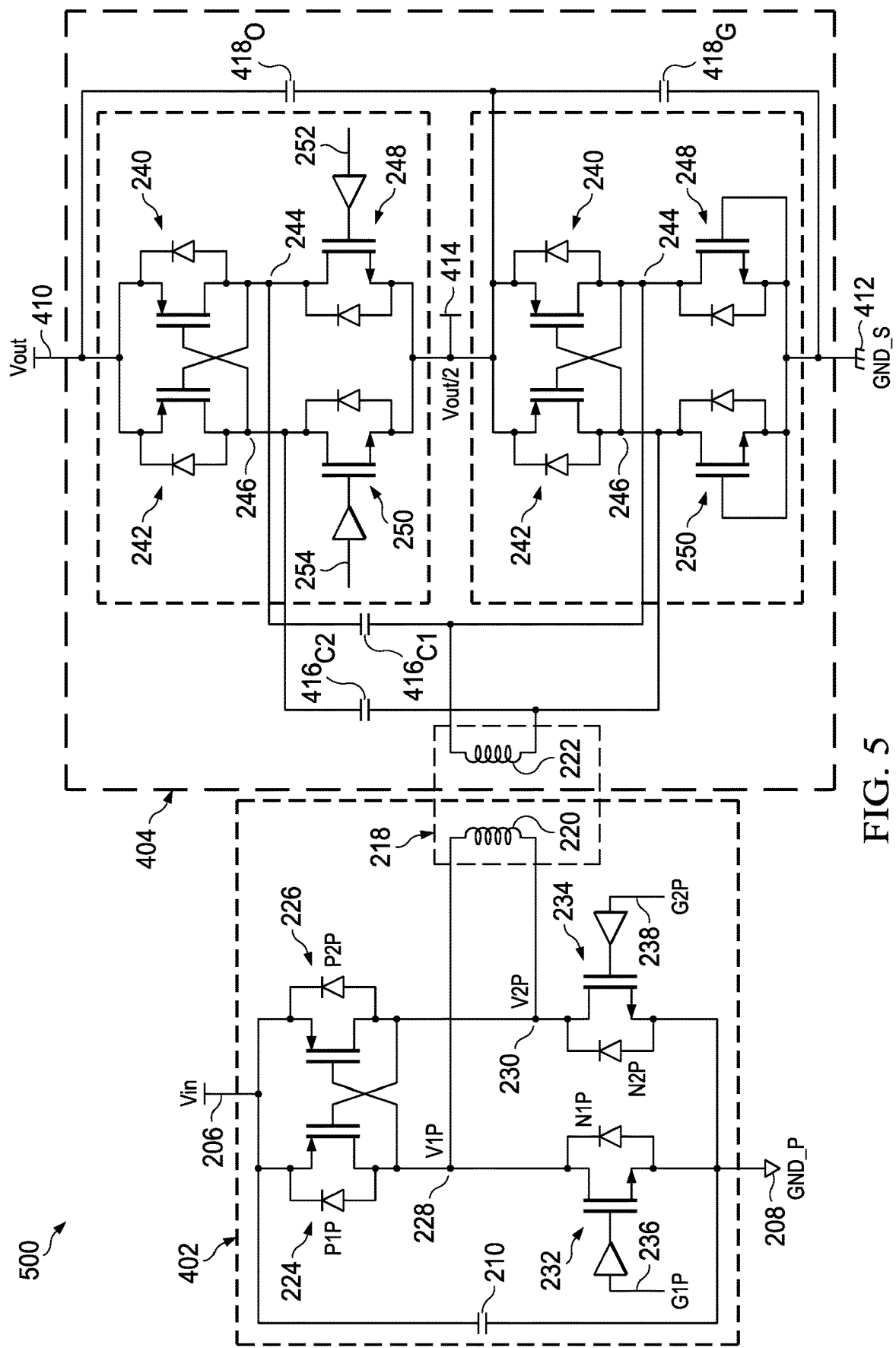
FIG. 5 shows a transistor-level diagram of a high output voltage isolated DC-DC converter.

In some embodiments, G1S 252 and G2S 254 can be tied to GND_S 214 or otherwise connected such that N1S 248 and N2S 250 remain always off (providing a diode-like effect) and perform passive rectification (as described further with respect to FIGS. 3 and 5). This can generally be done without compromising function of the output side 204, except that conduction losses from N1S 248 and N2S 250 will be higher than when they are switched (switching of N1S 248 and N2S 250 is further described with respect to FIG. 3). The increase in conduction losses from not switching N1S 248 and N2S 250 can be less relevant in high voltage applications, and may come with efficiency gains from avoiding use of control circuits to generate G1S 252 and G2S 254 signals. Whether switching N1S 248 and N2S 250 results in improved overall performance for the converter 200—as determined with respect to efficiency and/or other metric(s)—may be application-dependent.

FIG. 3 shows a timing diagram 300 for an isolated DC-DC converter 200 as shown in and described with respect to FIG. 2.

In FIG. 3, VLP 302 is the voltage across the primary side 220 of the transformer 218 and equals the voltage at V1P 228 minus the voltage at V2P 230. Voltage across the primary side 220 is therefore positive when V1P 228 is higher voltage than V2P 230 and negative when V2P 230 is higher voltage than V1P 228. ILP 304 is the current across the primary side 220 from node V1P 228 to node V2P 230, and is positive flowing from V1P 228 to V2P 230 and negative flowing from V2P 230 to V1P 228.

VLS 306 is the voltage across the secondary side 222 of the transformer 218 and equals the voltage at V1S 244 minus the voltage at V2S 246. Voltage across the secondary side 222 is therefore positive when V1S 244 is higher voltage than V2S 246 and negative when V2S 246 is higher voltage than V1S 244. ILS 308 is the current across the secondary side 222 from node V1S 244 to node V2S 246, and is positive flowing from V1S 244 to V2S 246 and negative flowing from V2S 246 to V1S 244.

As shown in the timing diagram 300 of FIG. 3, at time $T_0$ G1P 236 is low, meaning N1P 232 is off, and G2P 238 is high, meaning N2P 234 is on. Because N2P 234 is on, V2P 230 and the gate of P1P 224 are connected to GND_P 208 and are therefore pulled low. As a result, P1P 224 is on, connecting V1P 228 and the gate of P2P 226 to Vin 206 and thereby pulling V1P 228 high, which causes P2P 226 to be off. This means that VLP 302 is high (V1P 228 is high and V2P 230 is low). ILP 304 (current across the primary side 220) has a slope determined by the interaction of Vin 206, Vout 212, and transformer parameters (e.g., the transformer turns ratio and the leakage inductance of the transformer 218 on the primary side 220). VLP 302 being high will contribute to increasing the slope of ILP 304 (in a positive direction).

At time $T_1$, G2P 238 goes low, switching off N2P 234 so that GND_P 208 is no longer pulling down V2P 230. N2P 234 is turned off at a time selected to enable V2P 230 to be fully charged and V1P 228 to be fully discharged by the current through the inductor, ILP 304, before G1P 236 going high to switch on N1P 232 (i.e., to enable zero voltage turn-on of N1P 232). The current across the primary side 220, ILP 304, subsequently drives charge into the parasitic capacitances connected to V2P 230 (corresponding to C2 122, see FIG. 1)—which includes the gate-source capacitance of P1P 224, as described hereinabove with respect to FIG. 1—causing V2P 230 to increase and causing VLP 302 to fall to zero.

At time $T_2$, V2P 230 is high (fully charged by the current across the inductor 218, as described with respect to FIG. 2) and VLP 302 reaches zero voltage—i.e., zero voltage difference exists between V1P 228, which is high, and V2P 230, which is also high. V2P 230 being high causes MP 224 to turn off, so that V1P 228 is no longer pulled up by Vin 206. This allows ILP 304 to drive charge out of P2P's 226 gate capacitance and other parasitic capacitances at node V1P 228 (corresponding to C1 114, see FIG. 1) and recycle that charge as current across the primary side 220, resulting in V1P 228 going low, which causes VLP 302 to continue to fall. VLP 302 below zero contributes to decreasing the slope of ILP 304 (increasing the slope of ILP 304 in a negative direction).

At time $T_3$ 316, V1P 228 reaches its low state, so G1P 236 is controlled to go high to turn on N1P 232 (zero voltage switch on, i.e., ZVS). This connects V1P 228 to GND_P 208, pulling V1P 228 low. V1P 228 is already low when connected to GND_P 208, so no (or minimal) losses occur from discharge of parasitic capacitances connected to V1P 228 (corresponding to C1 114). V1P 228 being low turns on P2P 226, which connects V2P 230 to Vin 206, pulling V2P 230 high.

As shown in the timing diagram 300, signal behaviors of the converter 200 at times $T_4$, $T_5$ and $T_6$ echo the signal behaviors described with respect to FIG. 3 at times $T_1$, $T_2$ and $T_3$, respectively, except: voltages and currents across the primary side 220 have the opposite sign; and P2P 226, V2P 230, N2P 234 and G2P 238 have the behaviors described hereinabove with respect to MP 224, V1P 228, N1P 232 and G1P 236, and vice versa. Accordingly, $T_1$, $T_2$, $T_3$ cover a half cycle of operation of the converter 200, and $T_4$, $T_5$ and $T_6$ cover another half cycle of operation of the converter 200 (in the same cycle). Operation of the converter 200 (switch behaviors) during the half cycle covered by $T_4$, $T_5$ and $T_6$ is the same as operation of the converter 200 during the half cycle covered by $T_1$, $T_2$, $T_3$, except that the roles of switches (on both the input side 202 and the output side 204) on different sides of respective inductors (the primary side 220 and the secondary side 222) are exchanged to enable current to flow in the reverse direction. (This can also be thought of as repeating switch and signal behaviors of times $T_1$, $T_2$ and $T_3$ at times $T_4$, $T_5$ and $T_6$ as if the terminals of the primary side 220 are reversed, and the terminals of the secondary side 222 are reversed.)

Example timings for output side 204 switching and signals can be determined from FIG. 3. The output side 204 timings shown in FIG. 3 are examples, as described hereinabove, and output side 204 timings are generally independent from input side 202 timings.

For example, output side 204 switch control signals G1S 252 and G2S 254 will preferably turn on NMOS transistors N1S 248 and N2S 250 when voltage across the respective transistor is zero (at a time corresponding to a specified switching frequency; preferably, as soon as the voltage across the transistor reaches zero to maximize power transmitted to Vout 212). This also corresponds to voltage across the secondary side 222, VLS 306, being at a maximum positive or negative value, meaning that one of V1S 244 or V2S 246 is low, and the other is high. Accordingly, if V1S 244 is low (voltage across N1S 248 is zero), then G1S 252 switches on N1S 248, and if V2S 246 is low (voltage across N2S 250 is zero), then G2S 254 switches on N2S 250 (zero voltage turn-on). Also, G1S 252 or G2S 254 will switch off NMOS transistor N1S 248 or N2S 250 (respectively) when current through the secondary side 222, ILS 308, is zero (zero current turn-off) and voltage across the respective NMOS transistor being turned off is zero (zero voltage turn-off).

As shown in FIG. 5, in some embodiments, gates of low-side NMOS transistors N1S 248 and N2S 250 can be connected to ground so that they perform passive rectification on currents through the secondary side (ILS 308). This prevents negative output current (from Vout 212 to GND_S 214) and can reduce the need for complex rectification circuitry, at the cost of the voltage drop across N1S 248 and N2S 250 diodes.

Active (or synchronous) rectification is performed by low-side NMOS transistors N1P 232, N2P 234, N1S 248 and N2S 250 switching on to conduct current when the current is or is about to flow in the correct (positive) direction (from Vin 206 to GND_P 208, or from GND_S 214 to Vout 212), thereby preventing (negative) current in the opposite direction. Thus, when V1P 228, V2P 230, V1S 244 or V2S 246 might otherwise be too high, potentially causing power losses by resulting in negative current or (on the output side 104) reduced output voltage (at Vout 212), the problematic node will be grounded by N1P 232, N2P 234, N1S 248 or N2S 250, respectively. Switch and signal timings described with respect to, e.g., FIGS. 2 and 3 are used to achieve these results. Secondary side diodes (of N1S 248 and N2S 250) also help to prevent negative output current; accordingly, in the converter 200 as shown in FIG. 2, passive rectification is performed alongside active rectification.

Figure 4:
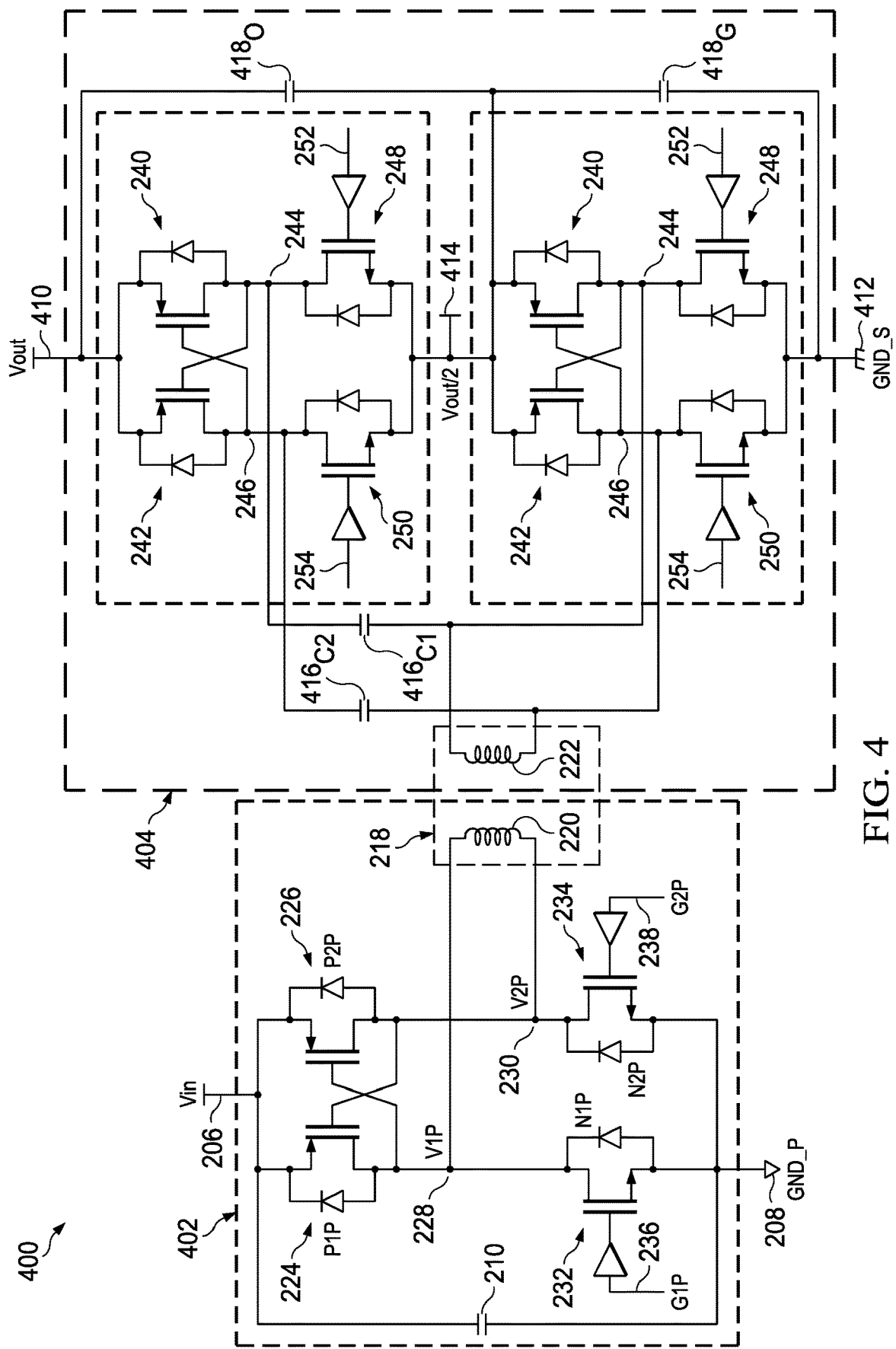
FIG. 4 shows a transistor-level diagram of a high output voltage isolated DC-DC converter.

FIG. 4 shows a transistor-level diagram of a high output voltage isolated DC-DC converter 400. In embodiments as shown in FIG. 4, the input side 402 of the converter 400 is arranged the same as the input side 202 of the converter 200 (see FIG. 2). The output side 404 of FIG. 4 comprises two instances of the output side 204 of the converter 200, an output instance 406 and a ground instance 408. The output instance 406 and the ground instance 408 are "stacked". Accordingly, Vout 212 of the output instance 406 comprises Vout 410 of the converter 400; GND_S 214 of the ground instance 408 comprises GND_S 412 of the converter 400; and GND_S 214 of the output instance 406 is connected to Vout 212 of the ground instance 408 at Vout/2 414.

Also, V1S 244 and V2S 246 are connected to the terminals of the secondary side 222 of the transformer 218 through isolation capacitors $416_{C1}$ and $416_{C2}$ which isolate the respective V1S 244 and V2S 246 nodes of the output instance 406 and the ground instance 408 from each other. Preferably, an output capacitor $418_O$ is connected between Vout 410 and Vout/2 414, and another output capacitor $418_G$ is connected between Vout/2 414 and GND_S 412.

The stacked output instance 406 and ground instance 408 act as a voltage doubler, with the input voltage of Vin 206 as the base (doubled) voltage. Vout/2 414 acts as the voltage output for the ground instance 408 and as the ground for the output instance 406 (the ground instance and output instance are otherwise isolated from each other by the isolation capacitors $416_{C1}$ and $416_{C2}$). Consequently, the voltage at Vout/2 414 is one half of the voltage at Vout 410 (and this voltage is also available as an output). The ground instance 408 and the output instance 406 each function similarly to the output side 204 of converter 200 of FIG. 2.

This means that the converter 400 of FIG. 4 retains the efficiency advantages of the converter 200 of FIG. 2, while being able to output twice as high a voltage—e.g., 10 volts output given a 5 volt input—without requiring components rated for a correspondingly higher voltage. For example, for a 5 volt input and 10 volt output, preferably, isolation capacitors 416 and output capacitors $418_O$, $418_G$ are 5 volt capacitors; and the various NMOS and PMOS transistors on the output side 204 of the converter 400 can be 5 volt transistors; with capacitors and transistors preferably fabricated using relatively inexpensive and/or straightforward processing techniques, preferably the same class of techniques, e.g., CMOS processing. Enabling high voltage output without requiring high voltage components lowers process complexity (e.g., component complexity, number of process steps and number of masks required) and therefore process cost and required device area, and preserves applicability of CMOS fabrication (which is relatively simple and low cost and avoids fabrication process limitations). This approach also enables use of a relatively low transformer turns ratio, e.g., 1:1, maintaining transformer symmetry.

FIG. 5 shows a transistor-level diagram of a high output voltage isolated DC-DC converter 500 in which the bias of the NMOS transistors in the ground instance 408 of the output side 404, N1S 248 and N2S 250, are respectively connected to their own source, so that transistors N1S 248 and N2S 250 (of the ground instance 408) act as diodes. In embodiments as shown in FIG. 5, the resonance (the secondary side 214) is sufficient to drive charge into and out of the respective nodes V1S 242 and V2S 244 of the output instance 406 and the ground instance 408 to implement self-switching of respective PMOS transistors P1S 240 and P2S 242 and thereby drive the secondary side 222. This avoids switching losses from N1S 248 and N2S 250 without using control signals and without paying the power (and device area) cost of corresponding control circuitry.

However, the voltage drop across the NMOS transistors N1S 248 and N2S 250 in the ground instance 408 of the converter 500 shown in and described with respect to FIG. 5 is slightly higher than the voltage drop across the NMOS transistors N1S 248 and N2S 250 (switched using control signals G1S 252 and G2S 254) in the converter 400 shown in and described with respect to FIG. 4. This is because N1S 248 and N2S 250 in the ground instance 408 of the converter 500 in FIG. 5 are configured to act as diodes, rather than as switched transistors. As a result, slightly higher conduction losses occur in a converter 500 of FIG. 5 than in a converter 400 of FIG. 4. (In the ground instance 408 of the converter 500 of FIG. 5, N1S 248 and N2S 250 prevent negative output current due to their function as diodes.)

It may therefore be application-dependent as to whether a converter 400 (as in FIG. 4) or a converter 500 (as in FIG. 5) is more suited to a particular purpose or otherwise performs better with respect to application-related performance metrics.

Figure 6A:
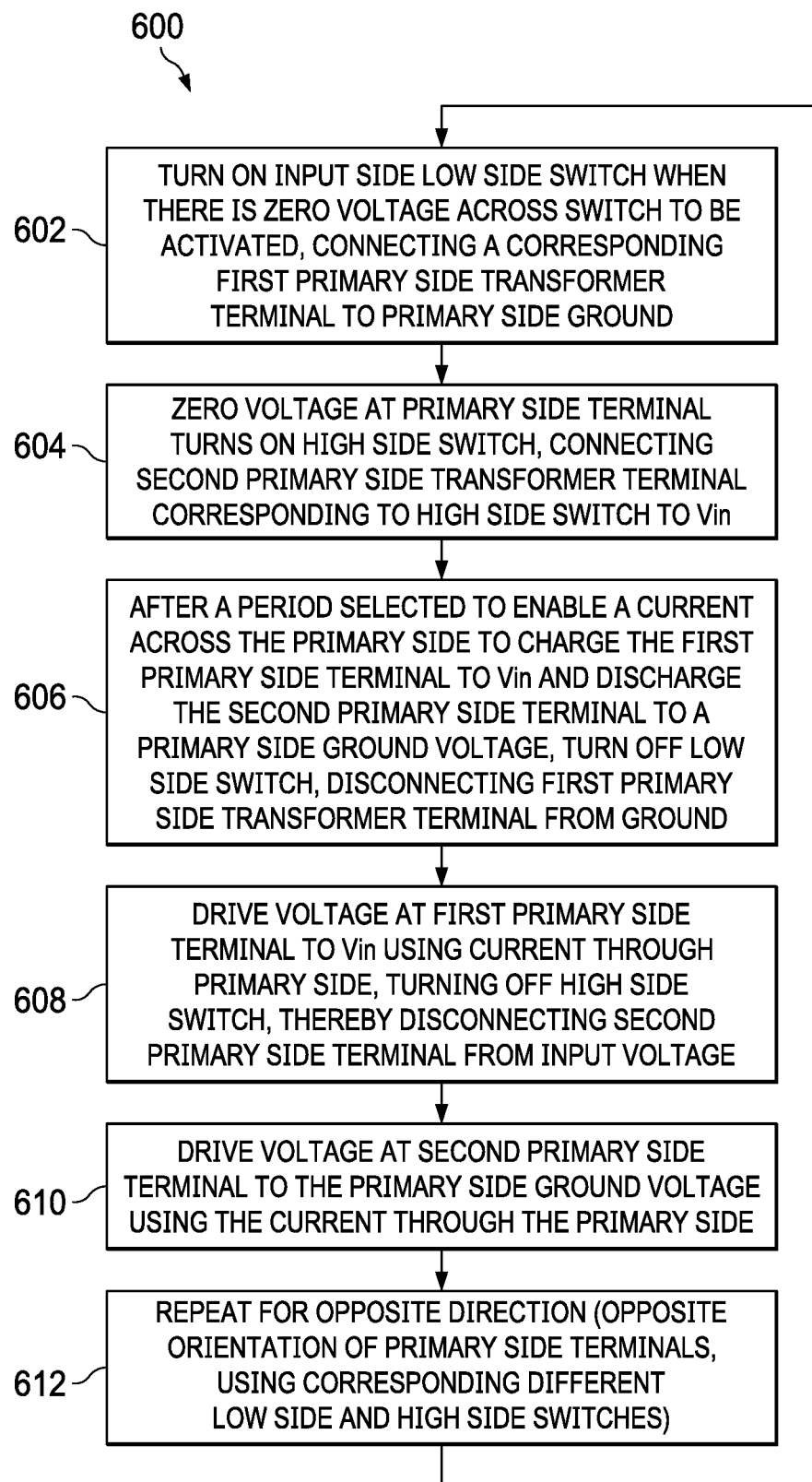
FIG. 6A shows an example of a process for controlling an isolated DC-DC converter.

FIG. 6A shows an example of a process 600 for controlling an isolated DC-DC converter. As shown in FIG. 6A, an input side 202 low side switch (e.g., NMOS) is turned on when zero voltage is across the low side switch, connecting a corresponding first primary side 220 transformer terminal to the primary side ground 208 (GND_P 208) in step 602. Zero voltage at the first primary side 220 terminal causes a high side switch (e.g., a PMOS that has its gate coupled to the first terminal, its drain coupled to a second primary side 220 transformer terminal and its source coupled to Vin 206) to turn on, connecting the second terminal to Vin 206 in step 604. After a period selected to enable a current through the primary side 220 to (after the low side switch is turned off) charge the first terminal to an input voltage 206 and discharge the second terminal to a primary side ground 208 voltage, the low side switch is turned off, disconnecting the first terminal from ground 208 in step 606. As a result, the gate of the self-driven high side switch is released (from ground 208), which allows the high side switch gate to be driven by current through the primary side 220 to input voltage Vin 206; this causes the high side switch to open, disconnecting the second terminal from Vin 206 in step 608. The current through the primary side 220 then drives the voltage at the second terminal to ground (GND_P 208) in step 610. The process is then repeated in the opposite direction (as if the terminals were reversed, i.e., the first terminal substituted for the second and vice versa, using different corresponding high side and low side switches) in step 612.

The disoverlap time between the turn off of the first low side switch and the turn on time of the second low side switch is selected to allow the full voltage swing of the switching nodes, enabling zero voltage switching of the second low side switch.

Figure 6B:
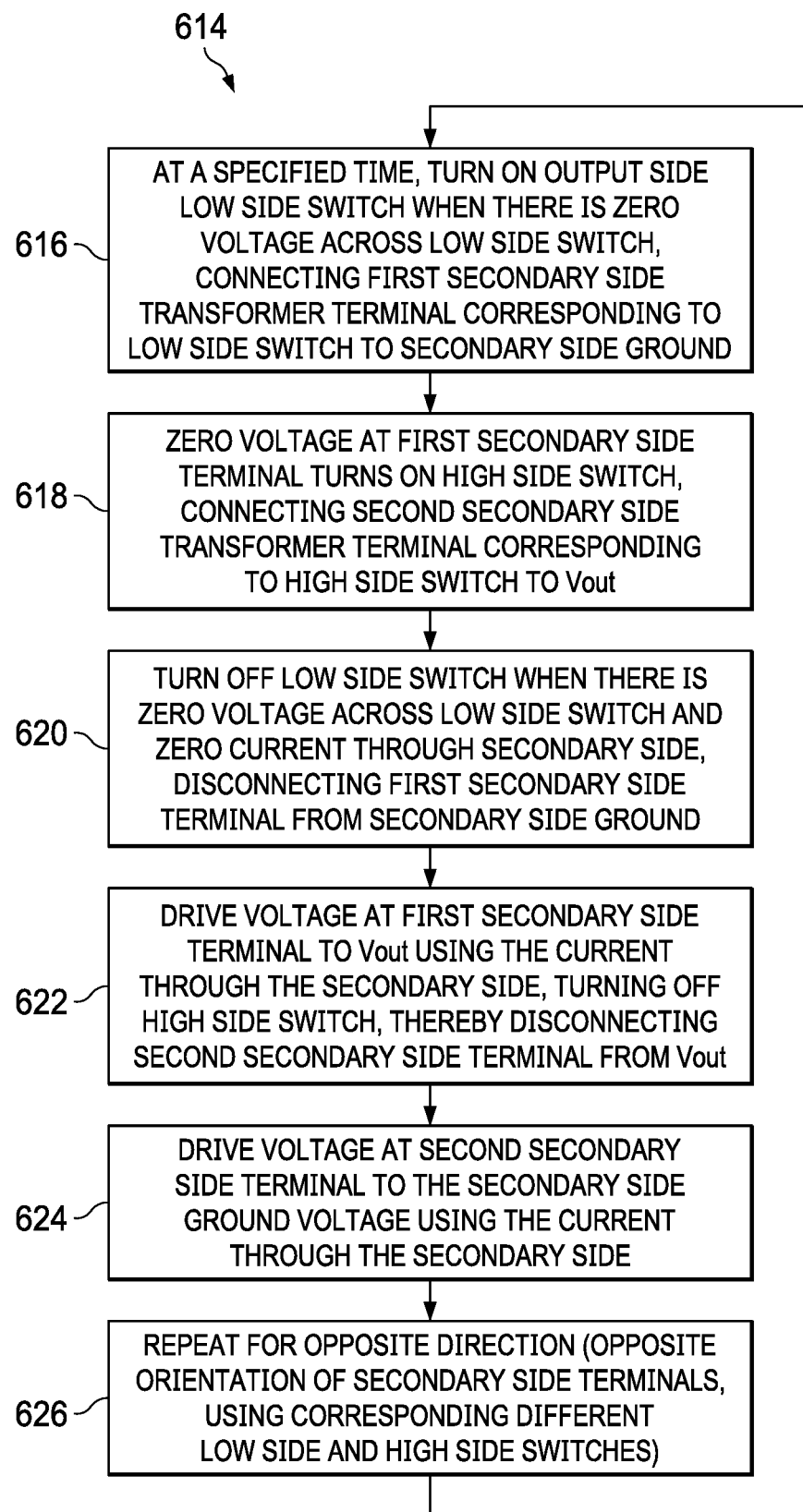
FIG. 6B shows an example of a process for controlling an isolated DC-DC converter.

FIG. 6B shows an example of a process 614 for controlling an isolated DC-DC converter. As shown in FIG. 6B, in step 616, an output side 204 low side (e.g., NMOS) switch is turned on at a specified time (corresponding to a specified switching frequency) when zero voltage is across the low side switch; turning on the low side switch connects a corresponding first secondary side 222 transformer terminal to the secondary side ground 214 (GND_S 214). The resulting zero voltage at the first secondary side 222 terminal causes a high side switch (e.g., PMOS) which is coupled to (when activated) connect a second secondary side 222 transformer terminal to Vout 212 to turn on, connecting the second terminal to Vout 212 in step 618. If zero current flows through the secondary side 222, and zero voltage is across the low side switch, then the low side switch is turned off, disconnecting the first secondary side 222 terminal from the secondary side ground 214 in step 620. This allows the first secondary side 222 terminal, and thus the high side switch gate, to be driven to output voltage Vout 212 by current through the secondary side 222. As a result, the gate of the high side switch opens, disconnecting the second secondary side 222 terminal from Vout 212 in step 622. The current through the secondary side 222 then drives the voltage at the second secondary side 222 terminal to the secondary side ground voltage in step 624. The process is then repeated in the opposite direction (with different corresponding high side and low side switches) in step 626.

Figure 7:
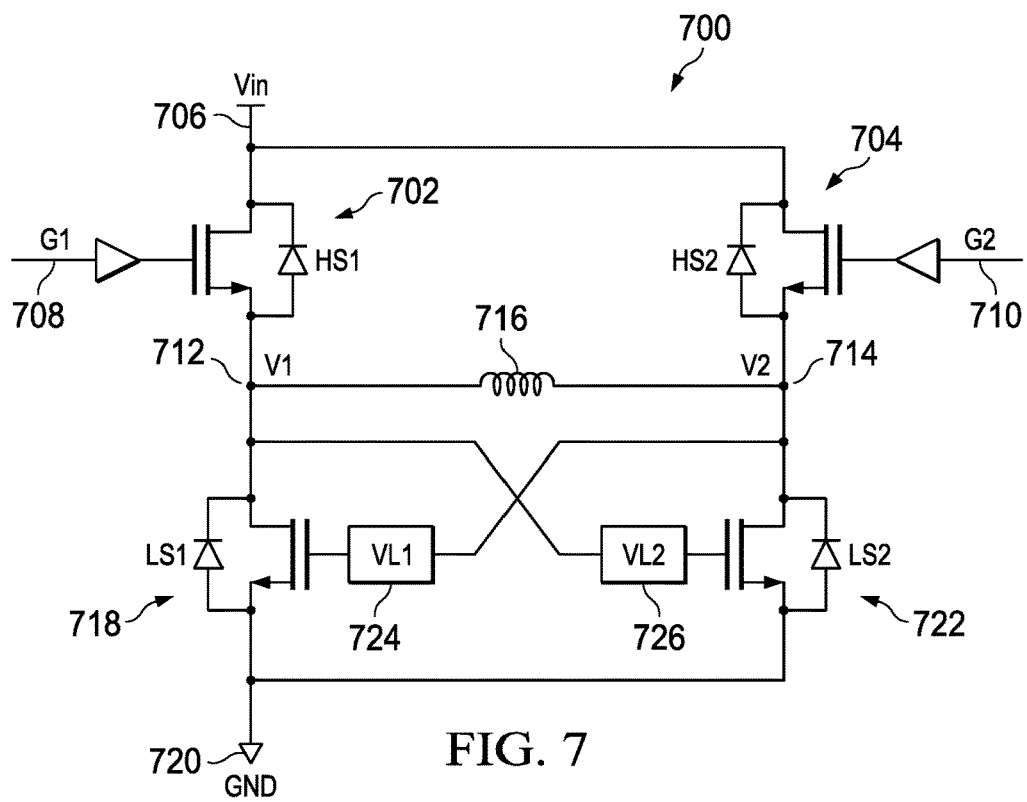
FIG. 7 shows an example of a transistor-level diagram of a circuit portion used to construct an isolated DC-DC converter.

FIG. 7 shows an example of a transistor-level diagram of a circuit portion 700 used to construct an isolated DC-DC converter. As shown in FIG. 7, the drains of two NMOS transistors HS1 702 (high side 1) and HS2 704 (high side 2) are connected to a voltage input Vin 706. The gate of HS1 702 is connected (via a buffer) to a control voltage G1 708, and the gate of HS2 704 is connected (via a buffer) to a control voltage G2 710. The source of HS1 702 is connected to node V1 712, and the source of HS2 704 is connected to node V2 714.

V1 712 is connected to a first terminal of an inductor 716, and V2 714 is connected to a second terminal of the inductor 716. An NMOS transistor LS1 718 (low side 1) is connected between V1 712 and a ground GND 720. An NMOS transistor LS2 722 (low side 2) is connected between V2 714 and GND 720. The sources of LS1 718 and LS2 722 are connected to GND 720. The gates and drains of LS1 718 and LS2 722 are cross-coupled between V1 712 and V2 714. Accordingly, the drain of LS1 718 is connected to V1 712, and the gate of LS1 718 is connected to V2 714 through a voltage limiter VL1 724; and the drain of LS2 722 is connected to V2 714, and the gate of LS2 722 is connected to V1 712 through a voltage limiter VL2 726. The bias voltage of LS1 718 is V2 714, limited by voltage limiter VL1 724, and the bias voltage of LS2 722 is V1 712, limited by voltage limiter VL2 726. Voltage limiters VL1 724 and VL2 726 are further described with respect to FIG. 10.

The inductor 716 can also be considered a primary side or a secondary side of a transformer—accordingly, as described with respect to FIG. 1, the primary side or secondary side of a transformer is an inductor. Circuit portion 700 can be used to construct an isolated DC-DC converter such that the primary side or secondary side of a transformer in the converter stands in place of the inductor 716, as shown with respect to FIGS. 8 and 10.

In operation, the NMOS transistors HS1 702 and HS2 704 are preferably zero voltage switched and zero current switched. Accordingly, G1 708 and G2 710 are controlled to turn on OR off (generally one or the other and not both; the other of turn-on or turn-off timing is determined using other criteria, such as further described with respect to FIG. 9) HS1 702 and HS2 704 when corresponding adjacent source nodes V1 712 and V2 714 are fully charged to Vin 706, and zero current flows across the inductor 716 (from node V1 712 to node V2 714 or vice versa). (Zero voltage switching and zero current switching are further described with respect to FIGS. 3 and 9.) This results in minimal switching losses, because little or no voltage is across (or little or no current is conducted by) HS1 702 or HS2 704 (for either the turn-on or turn-off transition), while they are switched.

In embodiments as shown in FIG. 7, power cost for MOSFET control is reduced by making LS1 718 and LS2 720 self-driving. Accordingly, rather than requiring control signals to bias LS1 718 and LS2 720, LS1 718 and LS2 720 are biased by charge driven to LS1 718 and LS2 720 via nodes V2 714 and V1 712 (respectively; and through voltage limiters VL1 724 and VL2 726, respectively) by the current through the resonance (inductor 716). Self-driving LS1 718 and LS2 720 reduces the complexity and power cost of controlling the MOSFETS.

Further power savings are achieved by using the current across the inductor 716 (the resonance current) to drive charge out of the gates of LS1 718 and LS2 720 and turn that charge into current across the inductor 716. Some of that current charges respective drain-source parasitic capacitances of adjacent high side and low side transistors, and gate-source parasitic capacitances of low side transistors. This recycling avoids dissipation of gate charges (Cgs charges) when LS1 718 and LS2 720 are switched, because those gate charges are reused. Accordingly, those gate charges (charges of gate-source parasitic capacitances), along with charges of respective drain-source parasitic capacitances, are driven out of parasitic capacitances adjacent to V1 712 or V2 714 by the resonance current, turned into current across the inductor 716, and (in part) are used to charge parasitic capacitances adjacent to V2 714 or V1 712 (respectively).

Because gate charge of LS1 718 and LS2 720 are reused, the tradeoff between QG (gate charge) and RDS (drain-source on resistance) can be largely avoided for LS1 718 and LS2 720. For example, a lower RDS can generally be used, thereby enabling faster switching and lower heat output, without resulting in excessive power costs due to a higher QG, because the gate charge power cost is largely avoided (energy used to bias LS1 718 and LS2 720 is repeatedly recovered) after initial charging. (The figure of merit FOM=QG*RDS will generally be approximately constant for a given process technology). Accordingly, the configuration shown in FIG. 7 enabling LS1 718 and LS2 720 to be self-driven is relatively non-dissipative compared to gate driving using control signals because energy is taken back from parasitic capacitances. Energy "recycling" is performed by discharging capacitances and turning voltage into current through the inductor 716. Switching losses are thereby minimized.

The sources of LS1 718 and LS2 720 are preferably connected directly to GND 720, reducing the power required to bias LS1 718 and LS2 720. Also, LS1 718 and LS2 720 can be driven using fixed frequency, fixed or adaptive duty cycle signals. Driving LS1 718 and LS2 720 at a fixed frequency, with a fixed or adaptive duty cycle, reduces the complexity and power cost of controlling the MOSFETS. (Duty cycle can be adaptive to maintain zero voltage switching and zero current switching conditions despite variations of circuit parameters or switching frequency.)

Preferably, RMS currents are minimized to thereby lower conduction losses.

Figure 8:
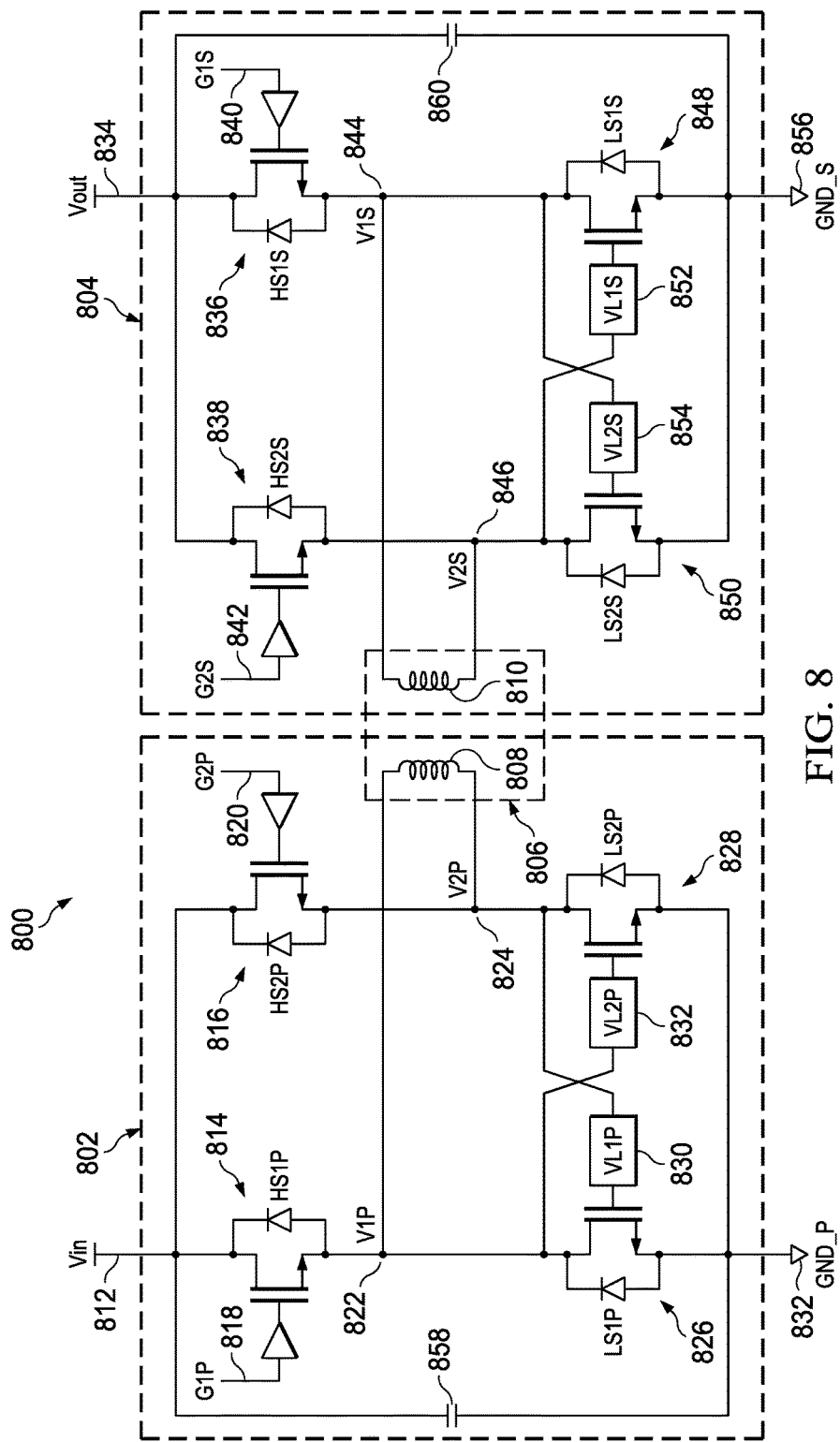
FIG. 8 shows a transistor-level diagram of an isolated DC-DC converter.

FIG. 8 shows a transistor-level diagram of an isolated DC-DC converter 800. The converter 800 can be broadly described as two instances of the circuit portion 700, one on the input side 802 and one on the output side 804. A transformer 806 comprises a primary side 808 and a secondary side 810. The primary side 808 and secondary side 810 of the transformer 806 each preferably function similarly, with respect to their respective side of the converter 800 (i.e., the input side 802 and the output side 804), to the inductor 716 of the circuit portion 700 described with respect to FIG. 7.

As shown in FIG. 8, on the input (i.e., primary) side 802, input voltage Vin 812 is connected to the drains of two high side NMOS transistors, HS1P 814 and HS2P 816. HS1P 814 and HS2P 816 are switched by control signals G1P 818 and G2P 820 connected (through buffers) to the gates of HS1P 814 and HS2P 816, respectively. Node V1P 822 is connected to the source of HS1P 814, and node V2P 824 is connected to the source of HS2P 816.

The drains and gates of low side NMOS transistors LS1P 826 and LS2P 828 are cross-coupled between V1P 822 and V2P 824, the connections between nodes (V2P 824 and V1P 822) and gates (of LS1P 826 and LS1P 828) being made through voltage limiters VL1P 830 and VL2P 832, respectively. Accordingly, the drain of LS1P 826 is connected to V1P 822, and the gate of LS1P 826 is connected to VL1P 830 which is connected to V2P 824; and the drain of LS2P 828 is connected to V2P 824, and the gate of LS2P 828 is connected to VL2P 832 which is connected to V1P 822. Voltage limiters VL1P 830 and VL2P 832 limit the voltage that reaches the gates of LS1P 826 and LS1P 828, respectively. For example, if Vin 812 is 12 volts, and LS1P 826 and LS1P 828 are fabricated to be biased by 5 volts, then VL1P 830 and VL2P 832 limit the voltages that reach the gates of LS1P 826 and LS1P 828, respectively, to 5 volts.

The sources of LS1P 826 and LS2P 828 are connected to primary side ground GND_P 834. The primary side 808 of the transformer 806 is connected between V1P 822 and V2P 824.

On the output side 804, output voltage Vout 834 is connected to the drains of two high side NMOS transistors, HS1S 836 and HS2S 838. HS1S 836 and HS2S 838 are switched by control signals G1S 840 and G2S 842 connected (through buffers) to HS1S 836 and HS2S 838, respectively. Node V1S 844 is connected to the source of HS1S 836, and node V2S 846 is connected to the source of HS2S 838.

The drains and gates of NMOS transistors LS1S 848 and LS2S 850 are cross-coupled between V1S 844 and V2S 846, the connections between nodes (V2S 846 and V1S 844) and gates (of LS1S 848 and LS1S 850) being made through voltage limiters VL1S 852 and VL2S 854, respectively. Accordingly, the drain of LS1S 848 is connected to V1S 844, and the gate of LS1S 848 is connected to VL1S 852 which is connected to V2S 846; and the drain of LS2S 850 is connected to V2S 846, and the gate of LS2S 850 is connected to VL2S 854 which is connected to V1S 844. The sources of LS1S 848 and LS2S 850 are connected to secondary side ground GND_S 856.

The secondary side 810 of the transformer 806 is connected between V1S 844 and V2S 846.

Switching on the input side 802 and on the output side 804 is preferably adaptive. Accordingly, current through the primary and secondary sides 808, 810 of the transformer 806 is (respectively) tracked at high side transistor turn-on on the primary side 808, and at high side transistor turn-off on the secondary side 810, to check whether current is positive or negative. Switch timing—signal timing for G1P 818, G2P 820, G1S 840 and G2S 842—is then adjusted to enable zero current switching of respective high side transistors. G1P 818 and G2P 820 are preferably controlled to switch on HS1P 814 and HS2P 816, respectively, when zero current flows through the primary side 808 of the transformer 806 and zero voltage is across the transistor being switched on. G1P 818 and G2P 820 are preferably controlled to switch off HS1P 814 and HS2P 816, respectively, at a time selected to enable the current across the primary side to (after the high side transistor is switched off) fully discharge V1P 822 or V2P 824 (respectively) to the primary side ground voltage and fully charge V2P 824 or V1P 822 (respectively) to the input voltage. G1S 840 and G2S 842 are preferably controlled to switch on HS1S 836 and HS2S 838, respectively, when zero voltage is across the transistor being switched on, at a time selected to correspond to a switching frequency dependent on the switching frequency of the primary side, and dependent on capacitor and inductor parameters. G1S 840 and G2S 842 are preferably controlled to switch off HS1S 836 and HS2S 838, respectively, when zero current flows through the secondary side 810 of the transformer 806 and zero voltage is across the transistor being switched off. Input side 802 and output side 804 switch timings are also preferably independent of each other.

The converter 800 also preferably comprises an input decoupling capacitor 858 connected between Vin 812 and GND_P 832, and an output decoupling capacitor 860 connected between Vout 834 and GND_S 856 (as described hereinabove for decoupling capacitors, also called ripple capacitors, of FIG. 2).

Figure 9:
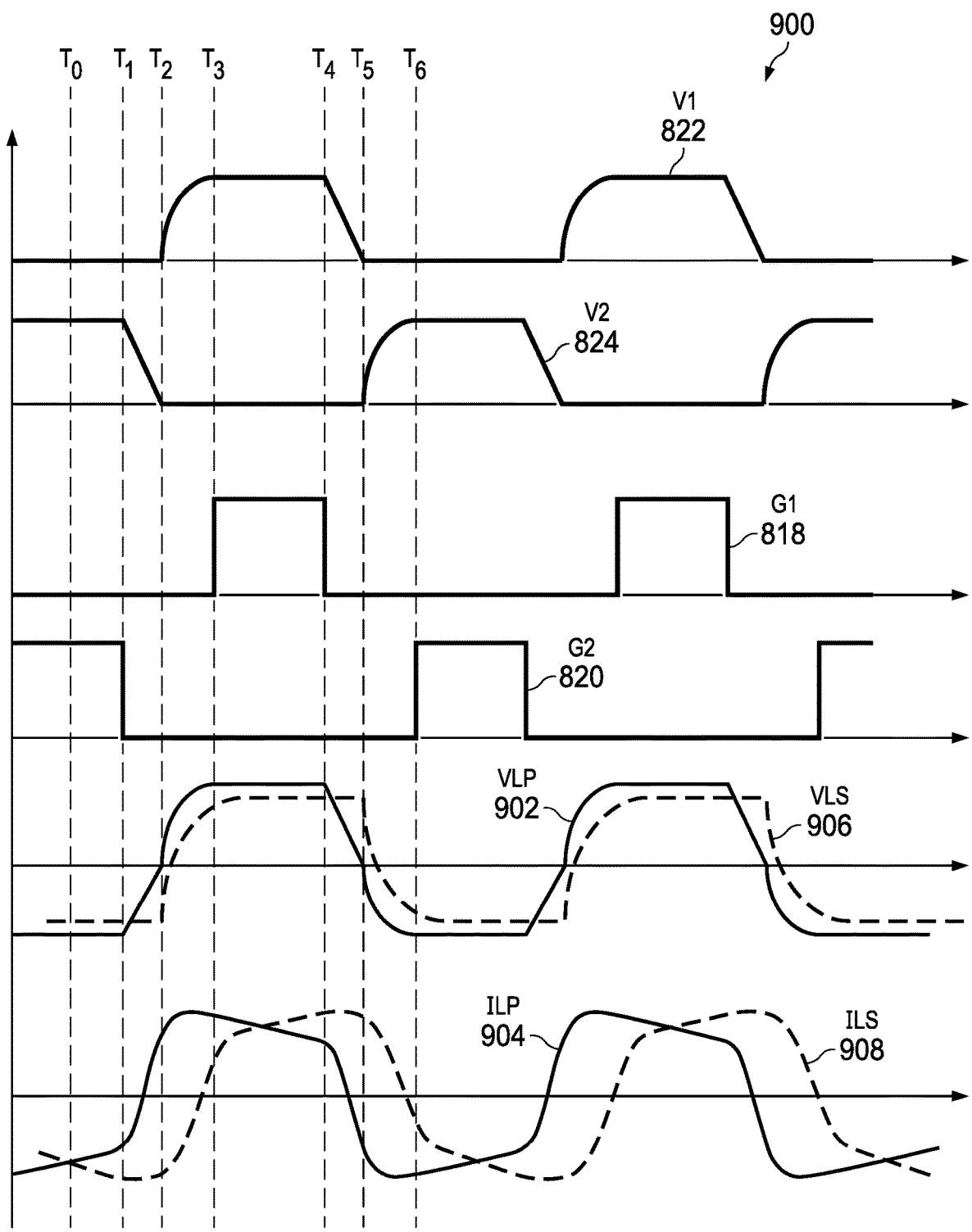
FIG. 9 shows an example of a timing diagram for an isolated DC-DC converter as shown in FIG. 8.

FIG. 9 shows an example of a timing diagram 900 for an isolated DC-DC converter 800 as shown in FIG. 8. In FIG. 9, VLP 902 is the voltage across the primary side 808 of the transformer 806 and equals the voltage at V1P 822 minus the voltage at V2P 824. Voltage across the primary side 808 is therefore positive when V1P 822 is higher voltage than V2P 824 and negative when V2P 824 is higher voltage than V1P 822. ILP 904 is the current across the primary side 808 from node V1P 822 to node V2P 824, and is positive flowing from V1P 822 to V2P 824 and negative flowing from V2P 824 to V1P 822.

VLS 906 is the voltage across the secondary side 810 of the transformer 806 and equals the voltage at V1S 844 minus the voltage at V2S 846. Voltage across the secondary side 810 is therefore positive when V1S 844 is higher voltage than V2S 846 and negative when V2S 846 is higher voltage than V1S 844. ILS 908 is the current across the secondary side 810 from node V1S 844 to node V2S 846, and is positive flowing from V1S 844 to V2S 846 and negative flowing from V2S 846 to V1S 844.

At time $T_0$, V1P 822 is low, V2P 824 is high, G1P 818 is low, and G2P 820 is high. Because G1P 818 is low, HS1P 814 is off. Because G2P 820 is high, HS2P 816 is on, connecting V2P 824 to Vin 812, pulling V2P 824 high. Because V1P 822 is low, LS2P 828 is off. Because V2P 824 is high, LS1P 826 is on, connecting V1P 822 to GND 834, pulling V1P 822 low. Also, VLP 902 is negative, and ILP 904 has a slope determined by Vin 812, Vout 834 and parameters of the transformer 806 (as described hereinabove for current with respect to FIG. 3). At time $T_0$, the voltage across HS2P 816 is zero, because the source-drain path of HS2P 816 is connected to Vin 812 and V2P 824, and V2P 824 is high.

At time $T_1$, while the voltage across HS2P 816 is zero and the current through the inductor ILP 904 is zero, G2P 820 is controlled to go low, turning off HS2P 816 and thereby achieving the desired zero voltage and zero current turn-off (ZVS and ZCS). As a result, charge in parasitic capacitances connected to V2P 824 is converted into current across the primary side 808 (ILP 904), causing V2P 824 (and therefore VLP 902) to fall.

At time $T_2$, V2P 824 is zero, turning off LS1P 826. VLP 902 is also zero (V1P 822 and V2P 824 are both zero). As a result, current across the primary side 808 (ILP 904)

charges the parasitic capacitances connected to V1P 822, causing V1P 822 to rise and VLP 902 to increase above zero.

At time $T_3$, V1P 822 is high, turning on LS2P 828, and G1P 818 goes high, turning on HS1P 814, which pulls up V1P 822. At time $T_3$, the voltage across HS1P 814 is zero, because the source-drain path of HS1P 816 is connected to Vin 812 and V1P 822, and V2P 822 is high. Also at time $T_3$, VLP 902 is positive.

As shown in the timing diagram 900, signal behaviors of the converter 800 at times $T_4$, $T_5$ and $T_6$ echo the signal behaviors described with respect to FIG. 9 at times $T_1$, $T_2$ and $T_3$, respectively, except: voltages and currents across the primary side 808 have the opposite sign; and HS1P 814, V1P 822, LS1P 826 and G1P 818 have the behaviors described hereinabove with respect to HS2P 816, V2P 824, LS2P 828 and G2P 820, and vice versa. (Accordingly, the switch and signal behaviors of times times $T_1$, $T_2$ and $T_3$ are preferably repeated at times $T_4$, $T_5$ and $T_6$ as if the terminals of the primary side 808 and secondary side 810 had been reversed.)

Example timings for output side 804 switching and signals can be determined from FIG. 9. The output side 804 timings shown in FIG. 9 (voltage across the secondary side 810, VLS 906, and current through the secondary side 810, ILS 908) are examples, as described hereinabove, and output side 804 timings are generally independent from input side 802 timings.

For example, output side 804 switch control signals G1S 840 and G2S 842 will preferably turn on HS1S 836 and HS2S 838 when VLS 906 is at a maximum positive or negative value, meaning that one of V1S 844 or V2S 846 is low, and the other is high. Accordingly, if V1S 844 is high, then G1S 840 switches on HS1S 836, and if V2S 846 is high, then G2S 842 switches on HS2S 838. Also, G1S 840 or G2S 842 will switch off NMOS transistor HS1S 836 or HS2S 838 (respectively) when current through the secondary side, ILS 810, is zero (zero current turn-off).

As shown in FIGS. 8 and 9, NMOS transistors HS1P 814, HS2P 816 perform active rectification on currents across the primary side 808 (ILP 904), and NMOS transistors HS1S 836 and HS2S 838 perform passive and active rectification on currents across the secondary side 810 (ILS 908), as described hereinabove regarding active and passive rectification with respect to FIG. 3. Switching of these NMOS transistors prevents both negative input currents and negative output currents. This can reduce the need for complex rectification circuitry.

Figure 10:
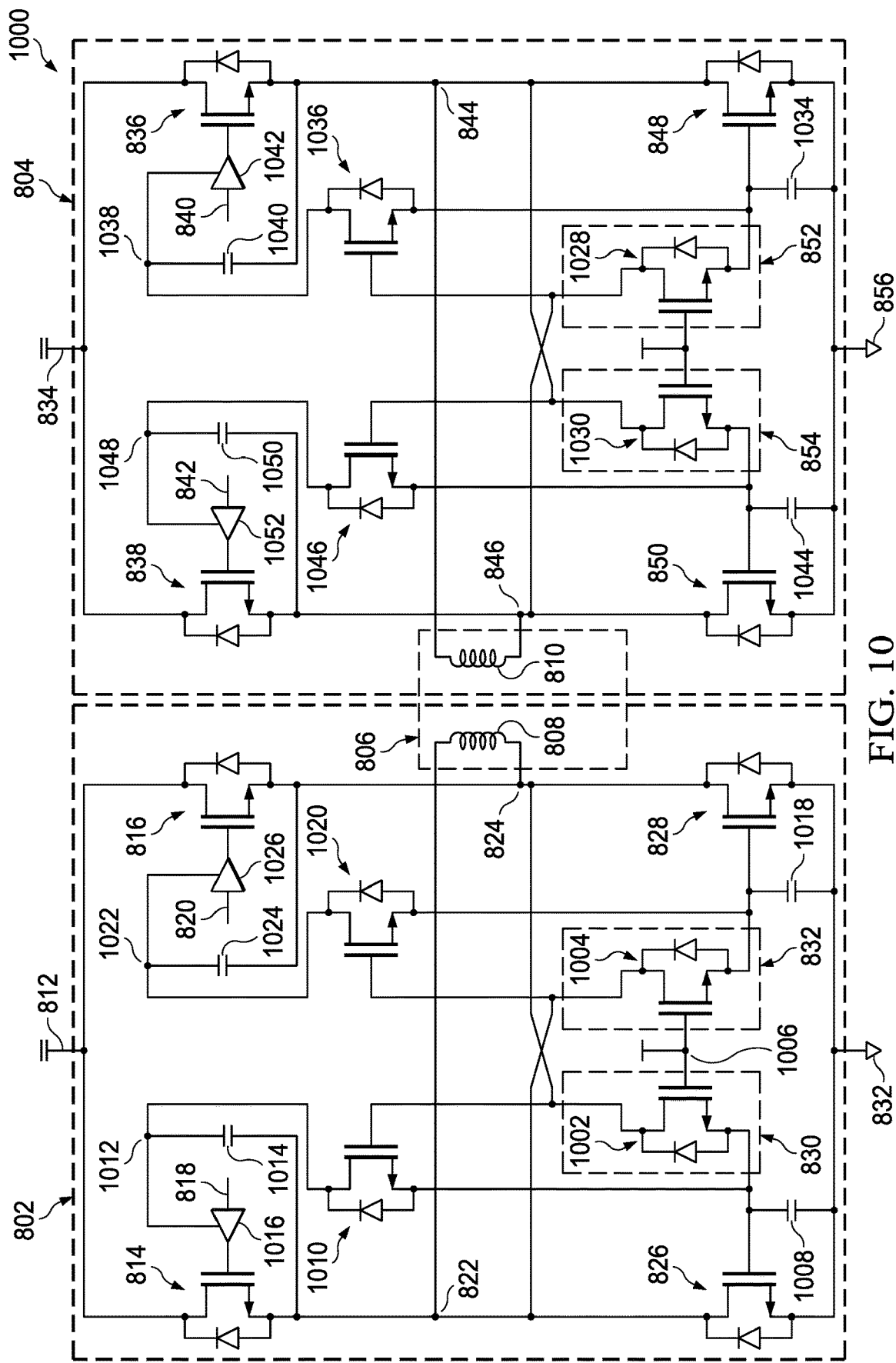
FIG. 10 shows an example of a transistor-level diagram of a high voltage isolated DC-DC converter.

FIG. 10 shows an example of a transistor-level diagram of a high voltage isolated DC-DC converter 1000. The converter 1000 of FIG. 10 is based on the converter 800 of FIG. 8, with voltage limiters comprising clamping NMOS transistors and bootstrap circuits used to drive the high side transistors. Generally, the operation and signal timings of the converter 1000 of FIG. 10 should be similar to those of FIG. 8. Vin 812 and Vout 834 can be significantly higher than 5 volts, e.g., Vin 812 of 12 volts and Vout 834 of 12 volts. Preferably, HS1P 814, HS2P 816, HS1S 836 and HS2S 838 are LDMOS transistors, enabling them to function effectively when biased by high voltages (e.g., 17 volts).

As shown in FIG. 10, starting from the converter 800 of FIG. 8: on the input side 802, voltage limiter VL1P 830 comprises an NMOS transistor VL1P 1002 and voltage limiter VL2P 832 comprises an NMOS transistor VL2P 1004. Both VL1P 1002 and VL2P 1004 preferably have their gates connected to an input voltage $V_{clamp}P$ 1006, which acts as a clamping voltage. $V_{clamp}P$ 1006 is preferably set to 5 volts so that the low side transistors LS1P 826 and LS2P 828 will not be biased by more than 5 volts. This enables LS1P 826 and LS2P 828 to be fabricated as CMOS devices (usually rated for 5 volts or less).

The source of VL1P 1002 is preferably connected to the gate of LS1P 826, a capacitor C1P 1008 which is also connected to primary ground GND_P 834, and the source of a bootstrap circuit-controlling NMOS transistor BS1P 1010. The drain of VL1P 1002 is preferably connected to V2P 824 and to the gate of BS1P 1010. The drain of BS1P 1010 is preferably connected to a node $V_{BS}1P$ 1012, which is also connected to bootstrap capacitor $C_{BS}1P$ 1014 and to supply a level shifting buffer $B_{BS}1P$ 1016 (bootstrap capacitor $C_{BS}1P$ 1014 acts as the supply for the buffer $B_{BS}1P$ 1016). $C_{BS}1P$ 1014 is also connected to V1P 822. Buffer $B_{BS}1P$ 1016 is also connected to connect G1P 818 to the gate of HS1P 814. Because the voltage at $V_{BS}1P$ 1012 preferably rises several volts above the maximum voltage reached by V1P 822 (as further described hereinbelow), which itself is preferably significantly above 5 volts (e.g., 12 volts), $B_{BS}1P$ 1016 is used to protect control circuits producing G1P 818 (usually operating at 5 volts or less) from that elevated voltage, and to enable G1P 818 to effectively control HS1P 814. An example level shifting buffer can include multiple inverters, with successive inverters (in the direction of travel from the lower voltage regime to the higher voltage regime) having larger area transistors than preceding inverters.

The source of VL2P 1004 is preferably connected to the gate of LS2P 828, a capacitor C2P 1018 which is also connected to primary ground GND_P 834, and the source of a bootstrap circuit-controlling NMOS transistor BS2P 1020. The drain of VL2P 1004 is preferably connected to V1P 822 and to the gate of BS2P 1020. The drain of BS2P 1020 is preferably connected to a node $V_{BS}2P$ 1022, which is also connected to bootstrap capacitor $C_{BS}2P$ 1024 and to supply a level shifting buffer $B_{BS}2P$ 1026 (bootstrap capacitor $C_{BS}2P$ 1024 acts as the supply for the buffer $B_{BS}2P$ 1026). $C_{BS}2P$ 1024 is also connected to V2P 824. Buffer $B_{BS}2P$ 1026 is also connected to connect G2P 820 to the gate of HS2P 816. Because the voltage at $V_{BS}2P$ 1022 preferably rises several volts above the maximum voltage reached by V2P 824 (as further described hereinbelow), which itself is preferably significantly above 5 volts (e.g., 12 volts), $B_{BS}2P$ 1026 is used to protect control circuits producing G2P 820 (usually operating at 5 volts or less) from that elevated voltage, and to enable G2P 820 to effectively control HS2P 816.

On the output side 804, voltage limiter VL1S 852 comprises an NMOS transistor VL1S 1028 and voltage limiter VL2S 854 comprises an NMOS transistor VL2S 1030. Both VL1S 1028 and VL2S 1030 preferably have their gates connected to an input voltage $V_{clamp}S$ 1032, which acts as a clamping voltage. $V_{clamp}S$ 1032 is preferably set to 5 volts so that the low side transistors LS1S 848 and LS2S 850 will not be biased by more than 5 volts. This enables LS1S 848 and LS2S 850 to be fabricated as CMOS devices (usually rated for 5 volts or less).

The source of VL1S 1028 is preferably connected to the gate of LS1S 848, a capacitor C1S 1034 which is also connected to secondary ground GND_S 856, and the source of a bootstrap circuit-controlling NMOS transistor BS1S 1036. The drain of VL1S 1028 is preferably connected to V2S 846 and to the gate of BS1S 1036. The drain of BS1S 1036 is preferably connected to a node $V_{BS}1S$ 1038, which is also connected to bootstrap capacitor $C_{BS}1S$ 1040 and to supply a level shifting buffer $B_{BS}1S$ 1042 (bootstrap capacitor $C_{BS}1S$ 1040 acts as the supply for the buffer $B_{BS}1S$ 1042). $C_{BS}1S$ 1040 is also connected to V1S 844. $B_{BS}1S$ 1042 is also connected to connect G1S 840 to the gate of HS1S 836. Because the voltage at $V_{BS}1S$ 1038 preferably rises several volts above the maximum voltage reached by V1S 844 (as further described hereinbelow), which itself is preferably significantly above 5 volts (e.g., 12 volts), $B_{BS}1S$ 1042 is used to protect control circuits producing G1S 840 (usually operating at 5 volts or less) from that elevated voltage, and to enable G1S 840 to effectively control HS1S 836.

The source of VL2S 1030 is preferably connected to the gate of LS2S 850, a capacitor C2S 1044 which is also connected to secondary ground GND_S 856, and the source of a bootstrap circuit-controlling NMOS transistor BS2S 1046. The drain of VL2S 1030 is preferably connected to V2S 846 and to the gate of BS2S 1046. The drain of BS2S 1046 is preferably connected to a node $V_{BS}2S$ 1048, which is also connected to bootstrap capacitor $C_{BS}2S$ 1050 and to supply a level shifting buffer $B_{BS}2S$ 1052 (bootstrap capacitor $C_{BS}2S$ 1050 acts as the supply for the buffer $B_{BS}2S$ 1052). $C_{BS}2S$ 1050 is also connected to V2S 846. $B_{BS}2S$ 1052 is also connected to connect G2S 842 to the gate of HS2S 838. Because the voltage at $V_{BS}2S$ 1048 preferably rises several volts above the maximum voltage reached by V2S 846 (as further described hereinbelow), which itself is preferably significantly above 5 volts (e.g., 12 volts), $B_{BS}2S$ 1052 is used to protect control circuits producing G2S 842 (usually operating at 5 volts or less) from that elevated voltage, and to enable G2S 842 to effectively control HS2S 838.

Low side capacitors C1P 1008, C2P 1018, C1S 1034 and C2S 1044 help reduce the resonance frequency of the converter 1000. Maximum output power of the converter 1000 is a function of the resonance frequency and transformer 806 self inductance. Capacitors C1P 1008, C2P 1018, C1S 1034 can be physical capacitors, or can correspond to parasitic capacitance, depending on the maximum output power and the design of the transformer 806.

An NMOS transistor is turned on when its gate voltage is sufficiently higher than its source voltage. The bootstrap capacitors 1016, 1026, 1042, 1052 are used to elevate the gate voltage provided by respective control signals 818, 820, 840, 842 to enable their respective high side PMOS transistors 814, 816, 836, 838 to turn on. As shown in FIG. 10, source voltages (V1P 822, V2P 824) of input side 802 high side PMOS transistors 814, 816 can reach approximately Vin 812; and source voltages (V1S 844 and V2S 846) of output side 804 high side PMOS transistors 836, 838 can reach approximately Vout 822. Using bootstrap capacitors enables high side PMOS transistor gate control voltages (outputs of level shifting buffers 1016, 1026, 1042, 1052, which are dependent on control voltages 818, 820, 840, 842) to reach higher than the input voltage Vin 812 or output voltage Vout 834 (as appropriate).

The charging path for bootstrap capacitor $C_{BS}1P$ 1014 (path of current that charges the capacitor) runs from Vin 812, through HS2P 816, to V2P 824, through VL1P 1002 and BS1P 1010, to $V_{BS}1P$ 1012, to $C_{BS}1P$ 1014.

The charging path for bootstrap capacitor $C_{BS}2P$ 1024 runs from Vin 812, through HS1P 814, to V1P 822, through VL2P 1004 and BS2P 1020, to $V_{BS}2P$ 1022, to $C_{BS}2P$ 1024.

The charging path for bootstrap capacitor $C_{BS}$ 1S 1040 runs from GND_S 856, through LS2S 850 to V2S 846, through VL1S 1028 and BS1S 1036, to $V_{BS}1S$ 1038, to $C_{BS}1S$ 1040.

The charging path for bootstrap capacitor $C_{BS}2S$ 1050 runs from GND_S 856, through LS1S 848 to V2S 844, through VL2S 1030 and BS2S 1046, to $V_{BS}1S$ 1048, to $C_{BS}1S$ 1050.

The bootstrap capacitors 1014, 1024, 1040, 1050 charge when their respective adjacent node 822, 824, 844, 846 is low. Accordingly, $C_{BS}1P$ 1014 charges when V1P 822 is low; $C_{BS}2P$ 1024 charges when V2P 824 is low; $C_{BS}1S$ 1040 charges when V1S 844 is low; and $C_{BS}2S$ 1050 charges when V2S 846 is low.

The converter 1000 also preferably comprises an input decoupling capacitor 858 connected between Vin 812 and GND_P 832, and an output decoupling capacitor 860 connected between Vout 834 and GND_S 856 (as described hereinabove for decoupling capacitors, also called ripple capacitors, of FIG. 2). Input and output decoupling capacitors 858, 860 are not shown for simplicity.

The described embodiments provide one or more of at least the following advantages. However, not all of these advantages result from every one of the described embodiments, and this list of advantages is not necessarily exhaustive.

Enables higher efficiency and decreased power use;
zero voltage and zero current switching;
enables higher voltage input and output with high efficiency;
enables higher voltage output and/or input without non-CMOS input and/or output capacitors;
enables integrated capacitances;
reduces device area requirements for input and/or output capacitors;
enables use of a low transformer turns ratio
enables use of higher switching frequencies;
avoids driving losses and QG/RDS tradeoff in self-driven transistors;
enables use of simplified rectification circuitry;
enables use of simplified driving control on the secondary side; and
reduces heat output.

In some embodiments, PMOS transistors cross-coupled between different terminals of a primary or secondary side of a transformer connect that side to a voltage input (on the primary side) or a voltage output (on the secondary side). NMOS transistors couple different terminals of that side of the transformer to the respective (primary or secondary side) ground. This enables the voltage input-connected transistors to be self-driven such that gate charge is reused, turned into current across the respective side of the transformer when the gate discharges. Further, NMOS transistors are preferably zero current switched (ZCS) and zero voltage switched (ZVS), avoiding significant switching losses. Also, transistor configuration and switch timing avoids negative input and output current. As a result, embodiments using high side cross-coupled switches are highly efficient.

In some embodiments, high side NMOS transistors couple different terminals of a primary or secondary side of a transformer to a voltage input (on the primary side) or a voltage output (on the secondary side). Low side NMOS transistors, cross-coupled (through voltage limiters coupled to the low side NMOS transistors' gates) to different terminals of the primary or secondary side of the transformer connect that side to the respective (primary or secondary side) ground. This enables the ground-connected transistors to be self-driven such that gate charge is reused, turned into current through the respective side of the transformer when the gate discharges. Further, high side transistors are preferably zero current switched (ZCS) and zero voltage switched (ZVS), avoiding significant switching losses. Also, transistor configuration and switch timing avoids negative input and output current. As a result, embodiments using high side cross-coupled switches are useful with high input and/or output voltages and are highly efficient.

Modifications and Variations

This description has various references to a "zero" current, a "zero" voltage, and a "zero" difference between voltages (e.g., "zero" voltage difference). As applied to example embodiments: (a) "zero" means equal to 0 or else approximately 0; and (b) "approximately 0" means near enough to 0 for the converter to satisfy its efficiency specification, notwithstanding any remaining losses (e.g., switching losses). In at least one example, efficiency is a ratio between: (a) power received from the converter; and (b) power applied to the converter. For an isolated DC-DC converter of example embodiments, the converter's efficiency specification is stated as a minimum threshold efficiency (such as 50%, which is a ratio of ½) for the converter to sustain during its usual operation. The converter's efficiency specification is one criteria to help determine whether the converter is suitable for use within a particular operating environment. In some examples, the transformer includes a magnetic coil, and the converter's efficiency specification is 80% or higher.

In some embodiments as shown in FIGS. 2 and 6, biases and sources of respective NMOS transistors are connected to each other, such that NMOS transistors act as diodes, as shown in FIG. 5.

In some embodiments, an isolated DC-DC converter as shown in FIG. 2, 4 or 5 can comprise NMOS instead of PMOS, and/or PMOS instead of NMOS. In some embodiments, an isolated DC-DC converter as shown in FIG. 2, 4 or 5 can comprise switches made using technologies other than (or supplementary to) CMOS, e.g., LDMOS.

In some embodiments, a high input voltage and high output voltage isolated DC-DC converter comprises an input side and an output side, each side comprising a "stacked" configuration as described with respect to the output side of FIG. 4. Accordingly, the output side comprises a "stacked" output side as described with respect to FIG. 4; and the input side comprises an input instance and a ground instance of the input side of FIG. 2, the Vin (input voltage) of the input instance comprising the Vin of the input side (i.e., the voltage input for the converter), the ground of the ground instance comprising the ground of the input side, and the ground of the input instance connected to the Vin of the ground instance. (Accordingly, the input side can comprise stacked instances of the input side of, e.g., FIG. 2.)

In some embodiments as shown in FIGS. 4 and 5, isolation capacitors isolate the ground instance from the transformer. In some embodiments as shown in FIGS. 4 and 5, isolation capacitors isolate both the ground instance and the output instance from the transformer.

The output instance and ground instance are also called an output module and ground module herein.

Modifications are possible in the described embodiments, and other embodiments are possible, within the scope of the claims.

What is claimed is:

1. A DC-DC converter comprising:
   an input node operable to receive an input voltage;
   a transformer that includes a first primary side terminal and a second primary side terminal;
   a first low-side switch coupled between the first primary side terminal and a primary side ground;
   a second low-side switch coupled between the second primary side terminal and the primary side ground;
   a first high-side transistor coupled between the first primary side terminal and the input node, wherein the first high-side transistor includes a gate coupled to the second primary side terminal;
   a second high-side transistor coupled between the second primary side terminal and the input node, wherein the second high-side transistor includes a gate coupled to the first primary side terminal; and
   a switch controller coupled to the first low-side switch and the second low-side switch, wherein the switch controller is operable to:
      close the first low-side switch when a first voltage between the first primary side terminal and the primary side ground is zero volts;
      open the first low-side switch to increase the first voltage to be the input voltage and to discharge a second voltage between the second primary side terminal and the primary side ground to be zero volts;
      close the second low-side switch when the second voltage is zero volts; and
      open the second low-side switch to increase the second voltage to be the input voltage and to discharge the first voltage to be zero volts.

2. The DC-DC converter of claim 1, wherein:
   the first high-side transistor is a first p-channel transistor and includes a source coupled to the input node and a drain coupled to the first primary side terminal; and
   the second high-side transistor is a second p-channel transistor and includes a source coupled to the input node and a drain coupled to the second primary side terminal.

3. The DC-DC converter of claim 2, wherein:
   the first low-side switch includes a first n-channel transistor and includes a source coupled to the primary side ground and a drain coupled to the first primary side terminal; and
   the second low-side switch includes a second n-channel transistor and includes a source coupled to the primary side ground and a drain coupled to the second primary side terminal.

4. The DC-DC converter of claim 1, wherein:
   the transformer further includes a first secondary side terminal and a second secondary side terminal; and
   the DC-DC converter further comprises:
      an output node;
      a third low-side switch coupled between the first secondary side terminal and a secondary side ground;
      a fourth low-side switch coupled between the second secondary side terminal and the secondary side ground;
      a third high-side transistor coupled between the first secondary side terminal and the output node, wherein the third high-side transistor includes a gate coupled to the second secondary side terminal; and
      a fourth high-side transistor coupled between the second secondary side terminal and the output node, wherein the fourth high-side transistor includes a gate coupled to the first secondary side terminal.

5. The DC-DC converter of claim 4, wherein the switch controller is further coupled to the third low-side switch and to the fourth low-side switch, and wherein the switch controller is operable to:
   open the third low-side switch when a third voltage between the first secondary side terminal and the secondary side ground is about zero volts and a current through the first secondary side terminal is about zero; and open the fourth low-side switch when a fourth voltage between the second secondary side terminal and the secondary side ground is about zero volts and the current through the first secondary side terminal is about zero.

6. The DC-DC converter of claim 4, wherein:
the third high-side transistor is a first p-channel transistor and includes a source coupled to the output node and a drain coupled to the first secondary side terminal; and
the fourth high-side transistor is a second p-channel transistor and includes a source coupled to the output node and a drain coupled to the second secondary side terminal.

7. The DC-DC converter of claim 6, wherein:
the third low-side switch includes a first n-channel transistor and includes a source coupled to the secondary side ground and a drain coupled to the first secondary side terminal; and
the fourth low-side switch includes a second n-channel transistor and includes a source coupled to the secondary side ground and a drain coupled to the second secondary side terminal.

8. The DC-DC converter of claim 1, wherein:
while the first low-side switch is closed, the second high-side transistor is closed, and the second low-side switch and the first high-side transistor are open; and
while the second low-side switch is closed, the first high-side transistor is closed, and the first low-side switch and the second high-side transistor are open.

9. The DC-DC converter of claim 1 further comprising a capacitor coupled between the input node and the primary side ground.

10. A voltage converter comprising:
an input node for receiving an input voltage;
an output node for providing an output voltage based on the input voltage;
a transformer that includes a primary coil coupled between a first node and a second node and a secondary coil coupled between a third node and a fourth node;
a first low-side transistor coupled between the first node and a primary side ground;
a second low-side transistor coupled between the second node and the primary side ground;
a first high-side transistor coupled between the first node and the input node, wherein the first high-side transistor includes a gate coupled to the second node;
a second high-side transistor coupled between the second node and the input node, wherein the second high-side transistor includes a gate coupled to the first node;
a capacitor coupled between the input node and the primary side ground;
a third low-side transistor coupled between the third node and a secondary side ground;
a fourth low-side transistor coupled between the fourth node and the secondary side ground; and
a switch controller coupled to the third low-side transistor and to the fourth low-side transistor, wherein the switch controller is operable to:
inhibit current through the third low-side transistor when a third voltage between the third node and the secondary side ground is zero volts and a current through the secondary coil is zero; and
inhibit current through the fourth low-side transistor when a fourth voltage between the fourth node and the secondary side ground is zero volts and the current through the secondary coil is zero.

11. The voltage converter of claim 10, further comprising:
a third high-side transistor coupled between the third node and the output node, wherein the third high-side transistor includes a gate coupled to the fourth node; and
a fourth high-side transistor coupled between the fourth node and the output node, wherein the fourth high-side transistor includes a gate coupled to the third node.

12. The voltage converter of claim 11, wherein:
the third high-side transistor is a first p-channel transistor and includes a source coupled to the output node and a drain coupled to the third node; and
the fourth high-side transistor is a second p-channel transistor and includes a source coupled to the output node and a drain coupled to the fourth node.

13. The voltage converter of claim 10, wherein:
the third low-side transistor is a first n-channel transistor and includes a source coupled to the secondary side ground and a drain coupled to the third node; and
the fourth low-side transistor is a second n-channel transistor and includes a source coupled to the secondary side ground and a drain coupled to the fourth node.

14. The voltage converter of claim 10, wherein the switch controller is configured to alternatingly close and open the third and fourth low-side transistors with a same frequency as the first and second low-side transistors.

15. The voltage converter of claim 10, wherein:
the first high-side transistor is a first p-channel transistor and includes a source coupled to the input node and a drain coupled to the first node; and
the second high-side transistor is a second p-channel transistor and includes a source coupled to the input node and a drain coupled to the second node.

16. The voltage converter of claim 10, wherein:
the first low-side transistor is a first n-channel transistor and includes a source coupled to the primary side ground and a drain coupled to the first node; and
the second low-side transistor is a second n-channel transistor and includes a source coupled to the primary side ground and a drain coupled to the second node.

17. The voltage converter of claim 10 wherein the switch controller is further coupled to the first low-side transistor and the second low-side transistor, and wherein the switch controller is operable to:
cause current to flow through the first low-side transistor when a first voltage between the first node and the primary side ground is about zero volts;
inhibit current through the first low-side transistor to increase the first voltage to be about the input voltage and to discharge a second voltage between the second node and the primary side ground to be about zero volts;
cause current to flow through the second low-side transistor when the second voltage is about zero volts; and
inhibit current through the second low-side transistor to increase the second voltage to be about the input voltage and to discharge the first voltage to be about zero volts.

18. The voltage converter of claim 10, wherein:
while the first low-side transistor is closed, the second high-side transistor is closed, and the second low-side transistor and the first high-side transistor are open; and
while the second low-side transistor is closed, the first high-side transistor is closed, and the first low-side transistor and the second high-side transistor are open.

* * * * *